United States Patent
Mondal et al.

(10) Patent No.: US 12,475,231 B1
(45) Date of Patent: Nov. 18, 2025

(54) HARDWARE SECURITY CHECKS IN STATIC VERIFICATION OF INTEGRATED CIRCUIT DESIGNS

(71) Applicant: Synopsys, Inc., Sunnyvale, CA (US)

(72) Inventors: Sudeep Mondal, Uttar Pradesh (IN); Barsneya Chakrabarti, Uttar Pradesh (IN); Ankit Arora, Uttar Pradesh (IN); Paras Mal Jain, San Jose, CA (US)

(73) Assignee: SYNOPSYS, INC., Sunnyvale, CA (US)

( * ) Notice: Subject to any disclaimer, the term of this patent is extended or adjusted under 35 U.S.C. 154(b) by 17 days.

(21) Appl. No.: 18/582,253

(22) Filed: Feb. 20, 2024

(51) Int. Cl.
*G06F 21/00* (2013.01)
*G06F 21/57* (2013.01)
*G06F 21/71* (2013.01)
*G06F 30/398* (2020.01)

(52) U.S. Cl.
CPC ............ *G06F 21/577* (2013.01); *G06F 21/71* (2013.01); *G06F 30/398* (2020.01); *G06F 2221/034* (2013.01)

(58) Field of Classification Search
CPC ...... G06F 21/577; G06F 21/71; G06F 30/398; G06F 2221/034
See application file for complete search history.

(56) References Cited

U.S. PATENT DOCUMENTS

| | | | |
|---|---|---|---|
| 2013/0074023 A1* | 3/2013 | Millendorf | G06F 30/33 716/112 |
| 2018/0032760 A1* | 2/2018 | Hu | G06F 21/71 |
| 2019/0286763 A1* | 9/2019 | Kastner | G06F 30/3312 |
| 2021/0064790 A1* | 3/2021 | Koelbl | G06F 21/78 |
| 2022/0382355 A1* | 12/2022 | Mondello | G06F 15/7807 |

OTHER PUBLICATIONS

W. Hu, A. Ardeshiricham and R. Kastner, "Identifying and Measuring Security Critical Path for Uncovering Circuit Vulnerabilities," 2017 18th International Workshop on Microprocessor and SOC Test and Verification (MTV), Austin, TX, USA, 2017, pp. 62-67, doi: 10.1109/MTV.2017.11. (Year: 2017).*

* cited by examiner

*Primary Examiner* — Ka Shan Choy
(74) *Attorney, Agent, or Firm* — Womble Bond Dickinson (US) LLP

(57) ABSTRACT

A method includes: receiving an integrated circuit design; classifying, by the processing device, a signal path of a sub-circuit of the integrated circuit design based on a connection between an input port of the signal path and a component of the sub-circuit to generate a classification of the signal path; computing, by the processing device, a security vulnerability result of the sub-circuit of the integrated circuit design based on the classification of the signal path and based on a trust level of a zone in a fan-in cone to an input port of the signal path; and generating a security vulnerability report based on the security vulnerability result of the sub-circuit of the integrated circuit design.

20 Claims, 13 Drawing Sheets

⇨ Path1: Input port in1 – Output port out1
⇨ Path2: Input port in1 – Output port out2

HARDWARE SECURITY CHECKS IN STATIC VERIFICATION OF INTEGRATED CIRCUIT DESIGNS

STATEMENT REGARDING FEDERALLY SPONSORED RESEARCH OR DEVELOPMENT

This invention was made with U.S. Government support under Agreement No. HR0011-20-9-0043, awarded by Defense Advanced Research Projects Agency. The U.S. Government has certain rights in the invention.

TECHNICAL FIELD

The present disclosure relates to the field of electronic design automation (EDA). In particular, the present disclosure relates to performing hardware security checks during static verification of integrated circuit designs.

BACKGROUND

Complex integrated circuits are composed of multiple sub-circuits, sometimes referred to as modules, which are designed to perform specific functions. For example, a system-on-chip (SoC) integrated circuit (IC) may include one or more processor cores of a central processing unit (CPU), memories, input/output devices and interfaces, graphics processing cores of a graphics processing unit (GPU), radio modems, and the like. As another example, these sub-circuits may also include modules that perform various functions, such as sub-circuits designed to implement secured memory for sensitive data (e.g., encryption keys) and special purpose sub-circuits for encrypting and decrypting data. Static verification in electronic design automation (EDA) relates to analyzing an integrated circuit design to check for potential problems or errors in the integrated circuit design, without performing a time consuming and computationally expensive full simulation of the operation of the integrated circuit design.

SUMMARY

Aspects of embodiments of the present disclosure relate to hardware security checks based on static verification of integrated circuit designs.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1A:
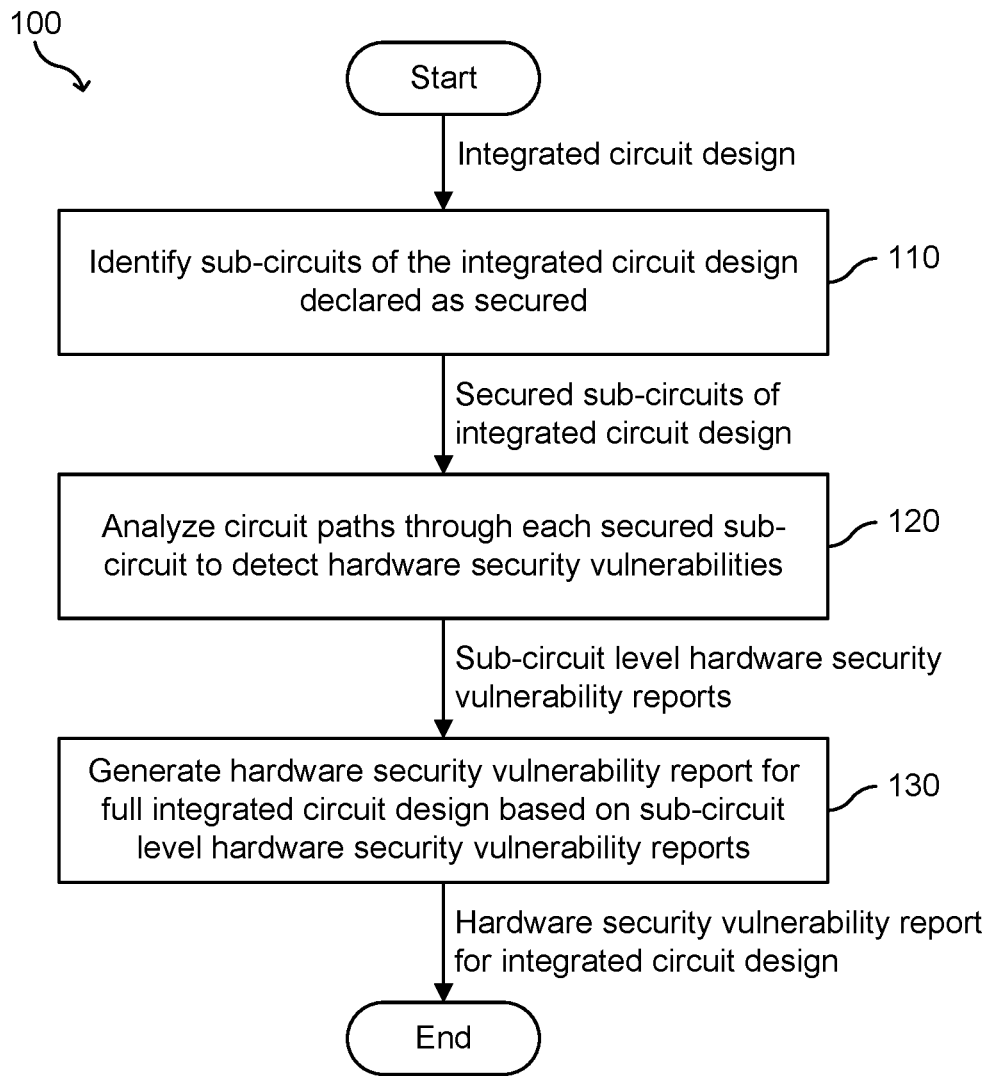
FIG. 1A is a flowchart depicting a method for performing a vulnerability analysis for an integrated circuit design including a plurality of sub-circuits, according to one embodiment of the present disclosure.

Aspects of the present disclosure relate to hardware security checks in static verification of integrated circuit designs.

Securing integrated circuits against attackers is an important part of protecting users. For example, an attacker may attempt to retrieve sensitive information (e.g., encryption keys) from a secured memory of a personal computing device (e.g., a smartphone), so that the attacker can impersonate the user when attempting to gain unauthorized access to computer systems (e.g., use the encryption key to authenticate to a computer system), such as to divert funds in a financial transaction. As another example, an attacker may attempt to override security protections on a smartphone, thereby allowing the attacker to install malicious software that eavesdrops on user activity on the smartphone.

Some examples of hardware attacks include side channel attacks, laser attacks, and trojan attacks. In a side channel attack, an attacker extracts protected information from a chip through physical communication channels (e.g., hardware emissions)—for example, a chip may consume different amounts of power based on the values of the individual bits of an encryption key, allowing an attacker to deduce encryption key by measuring the power consumption of the chip during a cryptographic operation. In a laser attack or laser fault injection (LFI), a laser is applied to a specific location in the chip to actively change a voltage signal, thereby corrupting data, change a clock signal, or the like—for example, a multiplexer may take inputs from a secured source (e.g., encryption keys in a secured memory) and one or more unsecured sources (e.g., data from main memory and the like), where changing a voltage level at a select line controlling the multiplexer selects which data source is supplied to the output of the multiplexer, and where an attacker may use LFI to cause the multiplexer to output data from the secured source at a time when it is designed to be reading from the unsecured source. In a trojan attack, an attacker tampers with the design of the integrated circuit (e.g., prior to fabrication of the physical chip specified by the integrated circuit design), such as by intentionally or inadvertently introducing vulnerabilities in one or more sub-circuits of the integrated circuit design—these vulnerabilities can later by triggered (e.g., based on specific inputs to the integrated circuit) to cause the integrated circuit to leak sensitive information.

Accordingly, aspects of embodiments of the present disclosure relate to performing static analysis of an integrated circuit design to check for potential hardware security issues and to report these potential problems to engineers such that the engineers can revise the design to harden the circuit against these attacks (e.g., side channel attacks, laser attacks, and trojan attacks).

Aspects of embodiments of the present disclosure relate to automatically analyzing an integrated circuit design expressed in, for example, a hardware description language (HDL) or other computer-readable representation of the integrated circuit design and generating a report that identifies portions of the integrated circuit design that exhibit security vulnerabilities. Some aspects of embodiments of the preset disclosure further relate to generating security scores for these identified portions of the integrated circuit design, thereby allowing an engineer to compare the relative security or insecurity of various parts of the integrated circuit (e.g., so that the engineer can focus on improving the security of the least secure portions). Some aspects of the present disclosure relate to analyzing an integrated circuit design and determining whether specific sub-circuits or modules that are designated as being security sensitive (e.g., storing or processing sensitive information such as encryption keys) receive inputs from sub-circuits or modules of the integrated circuit design that are untrusted (e.g., external pads or sub-circuits or modules designed by untrusted third-parties). Some aspects of embodiments of the present disclosure elate to analyzing data paths of protected or sensitive data through an integrated circuit design to identify the vulnerability of that data path to diversion of the data to an unsecured destination such as unsecured memory or an input/output interface of the integrated circuit.

Technical advantages of the present disclosure include but are not limited to detecting vulnerabilities early in a process of designing an integrated circuit, such as while the design is under active development, rather than during a testing phase (e.g., simulation and/or emulation) of the integrated circuit design, when it is more difficult to make changes to the integrated circuit design. In more detail, embodiments of the present disclosure relate to analyzing an integrated circuit design and providing quick feedback to a user (e.g., an engineer) regarding potential security vulnerabilities while the user is designing the integrated circuit (e.g., shortly after the engineer has added new sub-circuits or connections to the design). In some circumstances, this may be referred to as shift-left verification, where verification of the integrated circuit design is shifted to earlier stages of the design process. Embodiments of the present disclosure improve the operation of the fabricated integrated circuits because embodiments of the present disclosure identify security problems early in the integrated circuit design process, thereby allowing these security vulnerabilities (e.g., vulnerability to side channel attacks, laser attacks, trojan attacks, and the like) to be corrected or mitigated by an engineer.

FIG. 1A is a flowchart depicting a method for performing a vulnerability analysis for an integrated circuit design including a plurality of sub-circuits, according to one embodiment of the present disclosure.

An input integrated circuit design is provided to the method 100, where the integrated circuit design includes one or more sub-circuits or circuit modules. The various sub-circuits or circuit modules of an integrated circuit design may include, for example, one or more processor cores of a central processing unit (CPU), memories, input/output devices and interfaces, graphics processing cores of a graphics processing unit (GPU), radio modems, and the like. These sub-circuits or circuit modules may also include respective sub-circuits or sub-circuit modules arranged in a hierarchy. The sub-circuits included in an integrated circuit design may be prepared or designed in-house (e.g., internally at the same organization creating the integrated circuit design) or may be obtained from another entity (e.g., licensed from another organization that designs specialized sub-circuits or circuit modules). For example, an entity designing a system-on-chip (SoC) may choose to design a processor core in-house and license designs for radio modems (e.g., WiFi modem and cellular modem) and controllers for peripheral devices (e.g., universal serial bus or USB) from third parties. In some circumstances, these blocks of pre-designed circuits are referred to as intellectual property (IP) circuit modules.

Accordingly, the integrated circuit design includes trusted zones and untrusted zones. A zone of the integrated circuit design includes one or more of the sub-circuits of the integrated circuit design, such as a single third-party IP circuit module, a collection of circuit modules designed in-housed, a region of standard cells, input and output pads of the integrated circuit (e.g., through which the integrated circuit communicates with external devices), and the like. A zone may be designated in the design as being trusted or untrusted. For example, a zone that contains circuits designed by third parties may be designated as being untrusted, whereas a zone that contains circuits designed internally at the organization may be designated as being trusted. As another example, zones containing circuits directly connected to external pads (e.g., interfaces for testing and debugging the integrated circuit) may be designated as being untrusted.

In addition, in some embodiments one or more of the sub-circuits in the design may be designated or declared as being secured. For example, an engineer designing the integrated circuit may declare a sub-circuit as being secured because that sub-circuit processes sensitive information (e.g., encryption keys, user biometric data, and other private information is supplied to the sub-circuit and/or the sub-circuit produces outputs based on sensitive information)

and/or because the sub-circuit controls critical functionality of the integrated circuit (e.g., processing cores of a central processing unit of the integrated circuit design, special purpose computational accelerators such as graphics processing units and communications units, and the like). In some integrated circuit designs, all or substantially all the sub-circuits of the design may be designated as being secured.

At 110, the computer system identifies sub-circuits of the integrated circuit design that are declared as secured (e.g., as processing sensitive information or as controlling core functionality of the system) and that therefore should be checked for hardware security vulnerabilities. In some embodiments of the present disclosure, all the sub-circuits of the integrated circuit design may be identified as being secured sub-circuits to be analyzed for security vulnerabilities.

At 120, the computer system performs a security vulnerability analysis on each sub-circuit of the integrated circuit design that was declared as being secured, where the security vulnerability analysis is performed based on circuit paths through those sub-circuits. This produces a plurality of sub-circuit level security vulnerability reports or sub-circuit level security vulnerability analysis result for corresponding ones of the analyzed sub-circuits. Analyses according to some example embodiments of the present disclosure will be described in more detail below with respect to FIG. 1B, with reference to specific example analyses of circuit structures relating to clock paths, reset control paths, and data flow paths. These sub-circuit level security vulnerability analysis results are collected and combined by the computer system at 130 to produce a security vulnerability analysis report for the integrated circuit design.

Figure 1B:
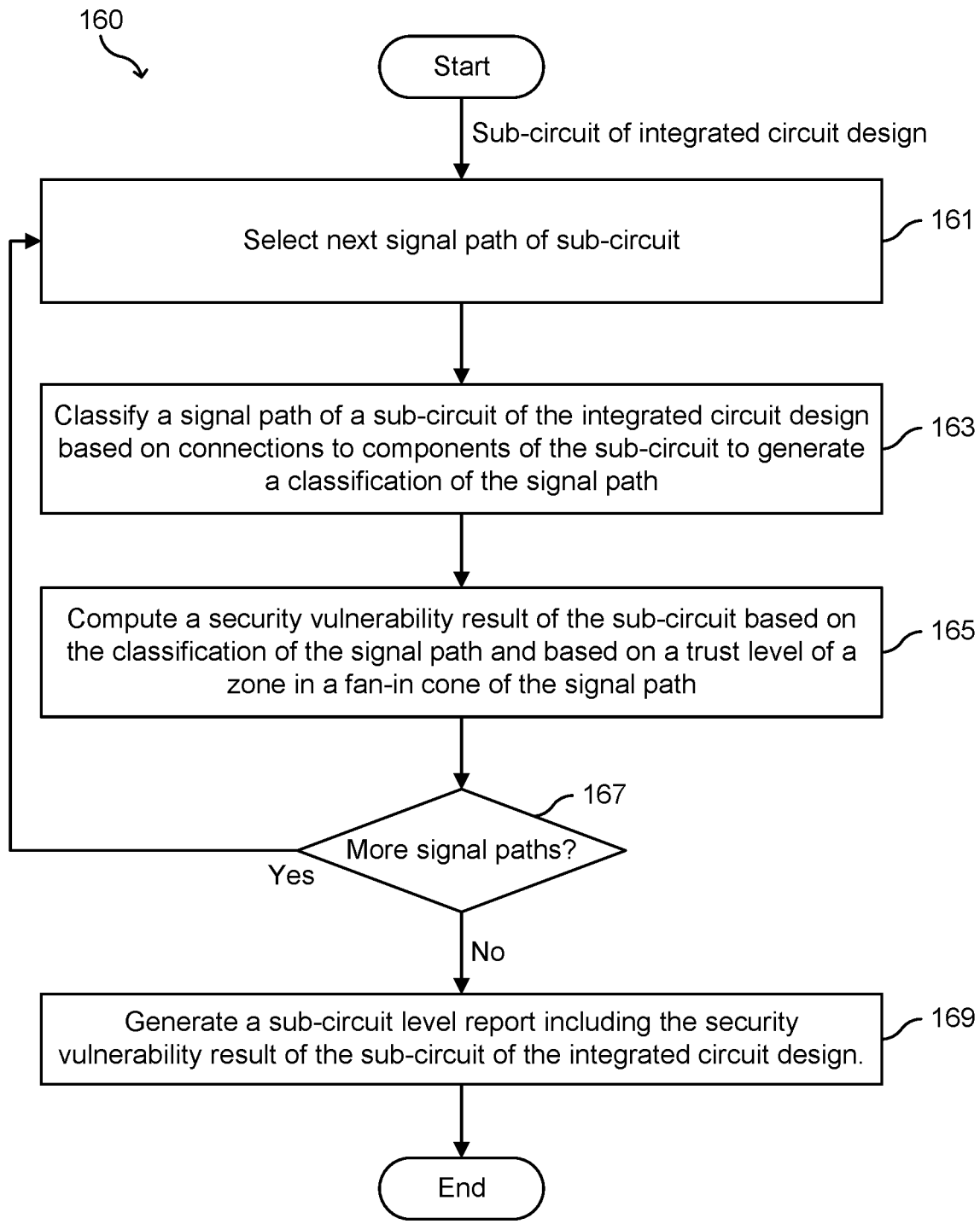
FIG. 1B is a flowchart depicting a method for detecting vulnerabilities in a sub-circuit of an integrated circuit design and generating a sub-circuit level hardware security vulnerability report, according to one embodiment of the present disclosure.

FIG. 1B is a flowchart depicting a method 160 for detecting vulnerabilities in a sub-circuit of an integrated circuit design and generating a sub-circuit level hardware security vulnerability report, according to one embodiment of the present disclosure. The method 160 shown in FIG. 1B describes some embodiments for analyzing circuit paths through a sub-circuit to detect hardware security vulnerabilities at 120 of the method 100 shown in FIG. 1A. Methods in accordance with various embodiments of the present disclosure may be implemented using a processing device which may include one or more computer systems. An example of a computer system 900 is described below with respect to FIG. 9.

Figure 1C:
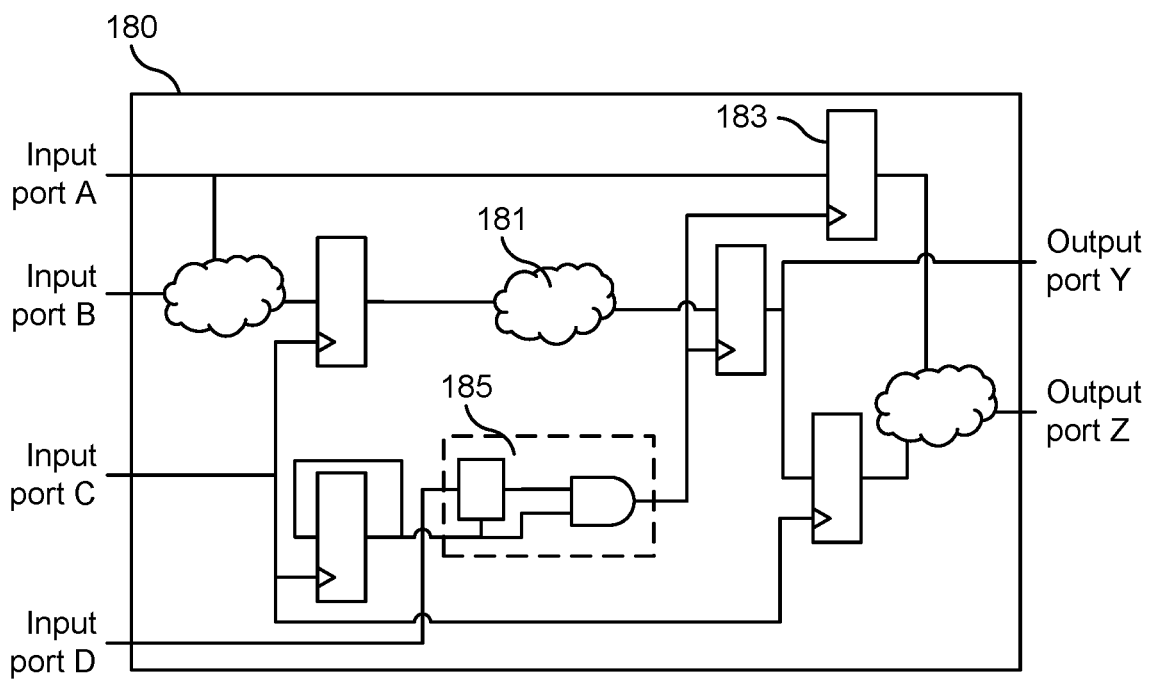
FIG. 1C is an example of a sub-circuit of an integrated circuit design analyzed in accordance with an embodiment of the present disclosure.

FIG. 1C is an example of a sub-circuit 180 of an integrated circuit design to be analyzed in accordance with an embodiment of the present disclosure. The example circuit shown in FIG. 1C has four input ports—labeled input port A, input port B, input port C, and input port D—and two output ports—labeled output port Y and output port Z. Each input and output port may have multiple parallel conductors forming a bus having a bus width—for example, input port A may represent an 8-bit wide bus (e.g., eight wires in parallel), while input port B may represent a 4-bit wide bus and output port Y may represent an 8-bit wide bus and output port Z may represent a 1-bit wide bus.

The sub-circuit 180 receives data from external sources at these input ports—e.g., from other sub-circuits of the integrated circuit design or from outside of the integrated circuit design (e.g., at an input port)—and outputs data to other sub-circuits of the integrated circuit design or to an external sink or load (e.g., at an output port). The other sub-circuits of the integrated circuit design that are along signal paths leading to an input port of the sub-circuit 180 are referred to as being part of a fan-in cone of that input port (or to that input port) and other sub-circuits of the integrated circuit design that are connected, directly or indirectly, to the output port are referred to as being part of the fan-out cone of the output port (or from the output port).

The sub-circuit 180 is shown as having various combinational logic networks 181 shown as clouds and various sequential elements 183, shown as flip-flops. The sub-circuit 180 also includes a clock gate 185 which is shown as including a latch and an AND gate, which allows portions of the integrated circuit design to be disabled, thereby reducing power consumption of the sub-circuit when those disabled potions are not needed (e.g., to power down a cellular radio of a system-on-chip when a mobile device is in airplane mode).

A given integrated circuit design includes many sub-circuits. Aspects of embodiments of the present disclosure may operate on an entire integrated circuit design (e.g., for a full system-on-chip integrated circuit) or may operate on portions of the integrated circuit design (e.g., portions implementing particular functionality, such as a biometric analysis portion of an integrated circuit device for analyzing and storing user biometrics to perform user identification, such as unlocking a mobile device using a fingerprint scan or a face scan). The input to method 160 shown in FIG. 1B is identified as a sub-circuit of an integrated circuit design and the term is used herein to refer to a sub-circuit of an entire integrated circuit design or a portion of an integrated circuit design.

A sub-circuit includes one or more signal paths connecting an input port to an output port as passing through one or more components of the sub-circuit. A given input port can be connected to multiple output ports (e.g., due to branches within the sub-circuit) and a given output port can be connected to multiple input ports (e.g., through the merging of input signals or the computation of results based on input signals received from different input ports). At 161, the computer system selects a next signal path of the sub-circuit for analysis, referred to below as the current signal path of the sub-circuit.

At 163, the computer system classifies the current signal path of the sub-circuit of the integrated circuit design based on detecting how the input is used within the sub-circuit. A signal is classified as a clock signal or a control signal associated with a clock path when that signal is used only in the portions of the sub-circuit controlling clocking mechanisms. Examples of clocking mechanisms include a clock divider, a clock gate (e.g., the clock gate 185 shown in FIG. 1C), a clock multiplexer, and a clock pin of a sequential element. In the example shown in FIG. 1C, input port C may be determined to be a clock signal because it is supplied only to clock pins of sequential elements (denoted by triangles), and where one of those sequential elements supplies a clock signal to the clock gate 185.

A signal is classified as a control signal when it is used only for conditional checks (e.g., if-else statement, case statement, conditional operator, as expressed in a hardware description language or HDL representation of the integrated circuit design) or present in the transitive fan-in cone of a conditional signal. In the example shown in FIG. 1C, input port D may be classified as a control signal because it is supplied only to an enable pin of the clock gate 185 (at the input to the latch).

A signal is classified as a data signal when it is present only in the data path. In the example sub-circuit 180 of FIG. 1C, input port A and input port B may be classified as pins associated with data paths because these data flow through combinational logic networks 181 and the data pins of sequential elements 183. A signal that is used both in data paths and control or clock paths will be considered a mixed signal.

Figure 1D:
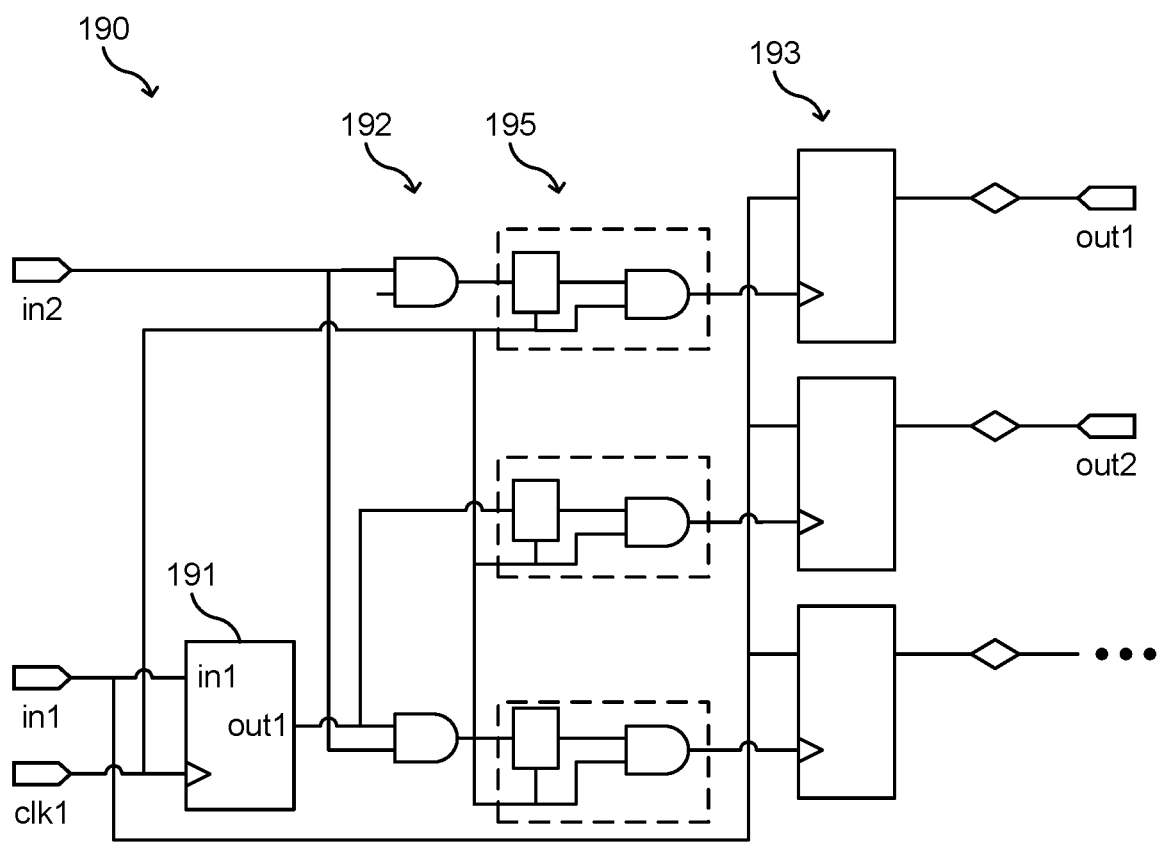
FIG. 1D is another example of a sub-circuit of an integrated circuit design analyzed in accordance with an embodiment of the present disclosure.

FIG. 1D is another example of a sub-circuit 190 of an integrated circuit design analyzed in accordance with an embodiment of the present disclosure. The sub-circuit 190 of FIG. 1D includes three input ports labeled in1, in2, and clk1 and has two output ports labeled out1 and out2 (additional output ports are indicated by dots and are not labeled in FIG. 1D). The sub-circuit 190 includes a secured sub-circuit 191 that may perform secured computations (e.g., encryption or decryption operations) based in input received from first input port in1. The sub-circuit further includes some combinational logic 192 and flip-flops 193, where the output ports are connected to the outputs of the flip-flops 193. The clock signals supplied to the clock pins of the flip-flops 193 are controlled by clock gates 195.

In analyzing this sub-circuit 190 to classify the signal paths at 163 of the method 160 shown in FIG. 1B, the computer system classifies input port clk1 as providing a clock signal because it is connected to the clock pins of flip-flops 193 (e.g., through the clock pins of clock gates 195). The computer system classifies input port in2 as providing a control signal present in the clock path because input port in2 is connected to the enable pins of clock gating cells (e.g., through the combinational logic 192). The computer system classifies input port in1 as a data signal because it is connected to the data pins of the flip-flops 193.

At 165 the computer system computes a security vulnerability result of the sub-circuit based on the classification on the signal path and based on a trust level of a zone in a fan-in cone of the signal path, as described in more detail below. In some embodiments of the present disclosure, based on the classification of the input port, the computer system analyzes the sub-circuit for different types of vulnerabilities. Clock signals are analyzed for clock path vulnerabilities, control signals are analyzed for reset path vulnerabilities, and data paths are analyzed for data flow vulnerabilities. Mixed signals will also be considered for data flow vulnerabilities and are also analyzed for data-control circuit overlap, as will be discussed in more detail below.

Figure 2:
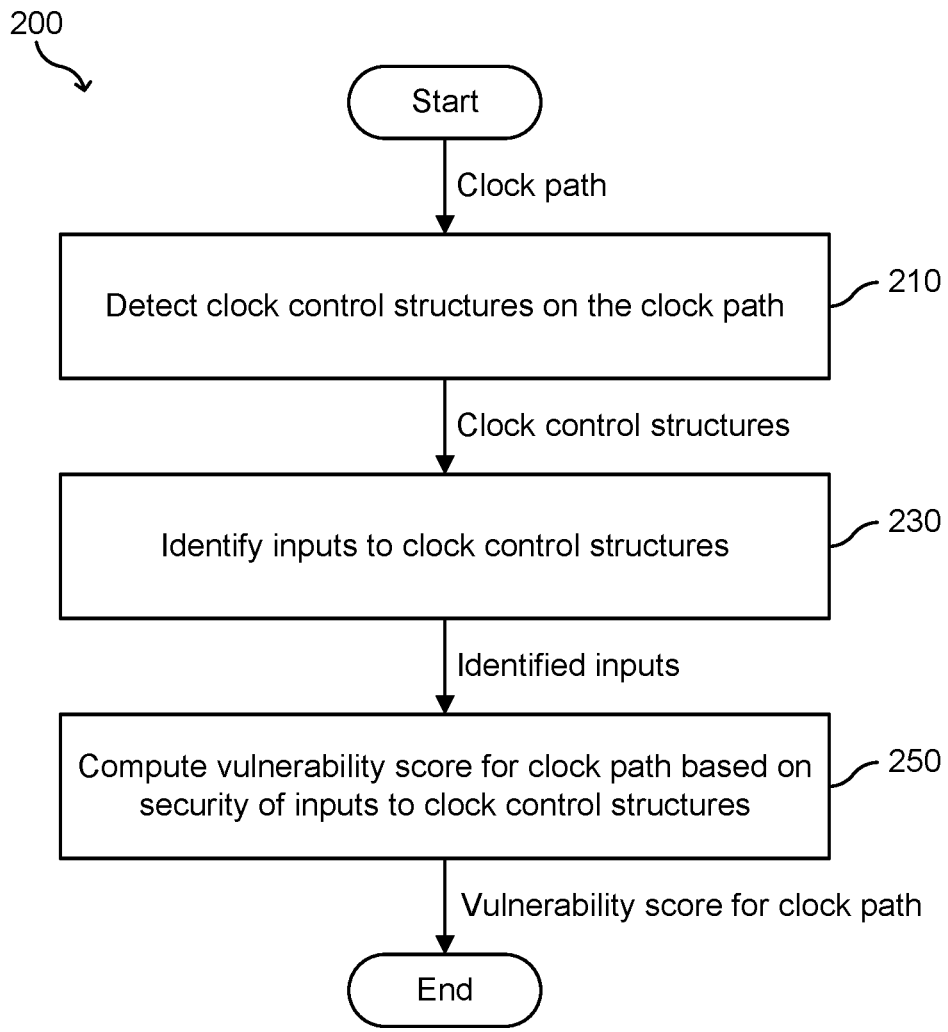
FIG. 2 is a flowchart depicting a method for detecting a clock path vulnerability, according to one embodiment of the present disclosure.

Aspects of embodiments of the present disclosure relate to analyzing a clock path for vulnerabilities (e.g., at 165 of method 160 shown in FIG. 1B). FIG. 2 is a flowchart depicting a method 200 for detecting a clock path vulnerability to measure vulnerability to tampering with a clock path, according to one embodiment of the present disclosure. Methods in accordance with various embodiments of the present disclosure may be implemented using a processing device which may include one or more computer systems. An example of a computer system 900 is described below with respect to FIG. 9.

Malicious control of signals present in clock circuitry can tamper with clock waveforms and alter the intended behavior of the integrated circuit, such as the leakage of secret information (e.g., encryption keys or decrypted data) or interruption of services provided by the integrated circuit (e.g., a denial-of-service attack). As such, some aspects of embodiments of the present disclosure relate to detecting security vulnerabilities in clock paths for distributing clock signals through an integrated circuit design. Aspects of embodiments of the present disclosure relate to automatically generating reports with vulnerability scores regarding vulnerabilities automatically detected in the clock paths of the sub-circuit, to direct engineers (e.g., chip design engineers) to modify the integrated circuit design to mitigate these vulnerabilities prior to fabrication of integrated circuits based on this design.

In some embodiments of the present disclosure, the threat model for these vulnerabilities includes trojans inserted into the clock path control logic of insecure sub-circuits along the clock path supplied to a sub-circuit (e.g., where the designs of these sub-circuits are supplied from an untrusted third-party), side channel attacks and reverse engineering using design for test (DFT) scan logic (e.g., connecting to portions of the integrated circuit that are used to test other parts of the integrated circuit).

As noted above, when the computer system identifies a current signal path as being a clock path, the computer system analyzes the path through the sub-circuit starting from that current input to detect clock path vulnerabilities.

At 210, the computer system identifies clock control structures on the clock path. Examples of clock control structures such include a clock divider, a clock gate, and a clock multiplexer (clock mux), although embodiments of the present disclosure are not limited thereto.

At 230, based on the type of identified clock control structure, the computer system identifies inputs to the clock control structures, examples of which are presented in more detail below.

At 250, the computer system computes a vulnerability score for the clock path based on determining whether the identified inputs receive signals from untrusted zones of the integrated circuit design that can affect the clock control structure and thereby change the clock waveforms output to other parts of the sub-circuit and/or other parts of the integrated circuit design. In some embodiments, the computing of the vulnerability score provides a binary response such as "vulnerability detected" or "no vulnerability detected" without providing gradations as to severity of the vulnerability. In some embodiments, the vulnerability score is calculated based on scores in accordance with the width of the bus of the control signals (e.g., in bits) and the number of branches in the control path for the clock (e.g., the control path for the select signal for a clock multiplexer or the control path for the enable signal of a clock gate), as described in more detail below with respect to data path analysis.

Specific examples of the computation of vulnerabilities for clock control structures will be described in more detail below in the case of a clock divider, a clock gate (or clock gating structure), and a clock multiplexer (or clock mux).

Figure 3A:
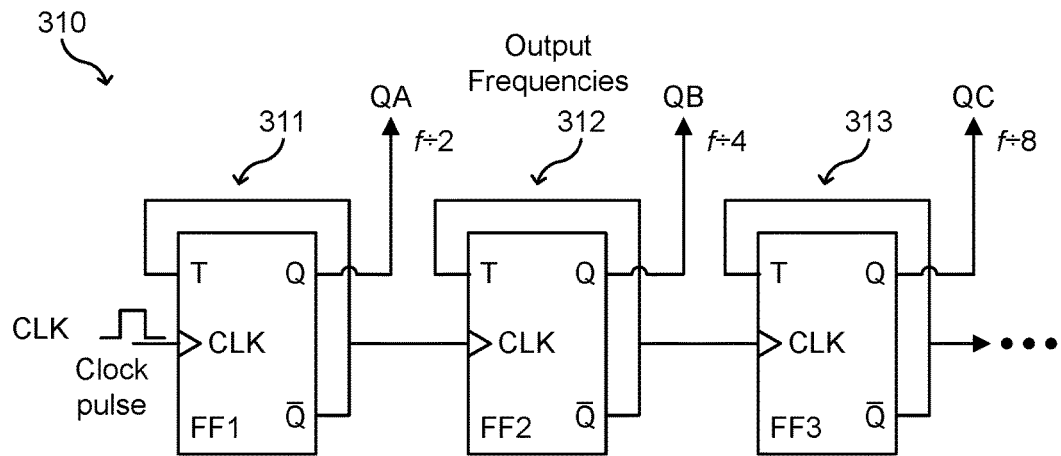
FIG. 3A depicts an example of a clock divider that is analyzed to detect vulnerabilities, according to one embodiment of the present disclosure.

FIG. 3A depicts an example of a clock divider 310 (or frequency divider) that is analyzed to detect vulnerabilities according to one embodiment of the present disclosure. A clock divider is a circuit that takes an input clock signal and generates one or more output clock signals of a different frequency. The example clock divider 310 of FIG. 3A takes an input clock signal CLK having frequency f and produces three output clock signals having frequencies f÷2, f÷4, and f÷8 using an arrangement of three D flip-flops arranged into three stages. In more detail, the input clock signal CLK is supplied to a clock pin of a first D flip-flop of a first stage 311, where the inverted output $\overline{Q}$ of the first D flip-flop is connected to the toggle pin T (or data pin) of the first D flip-flop and the noninverted output Q of the first D flip-flop produces a first output clock signal QA having a frequency that is half the input frequency (at f÷2). This first stage 311 is sufficient to be considered a clock divider, because it generates an output clock having half the frequency of the input clock.

Accordingly, some aspects of embodiments of the present disclosure relate to detecting a clock divider by detecting such a clock divider having a single stage in the sub-circuit (e.g., where the clock pin of the D flip-flop is connected to a clock signal and the inverting output of a D flip-flop is connected to the toggle pin or data pin of that D flip-flop). In the example of FIG. 3A, the clock divider 310 further includes a second stage 312 and a third stage 313 which produce the second and third output clocks QB and QC at corresponding frequencies of f÷4 and f÷8. The clock pin of a second D flip-flop of the second stage 312 is connected to the inverted output $\overline{Q}$ of the first D flip-flop of the first stage 311, and the clock pin of the third D flip-flop of the third stage 313 is connected to the inverted output $\overline{Q}$ of the second D flip-flop of the second stage 312. This can be chained to produce output clock signals at successive power-of-2 divisions of the input clock signal.

While FIG. 3A shows one example of a clock divider 310 according to one example, embodiments of the present disclosure are not limited thereto and also detect clock dividers implemented in other ways, such as where the output clock signal is taken from the inverted output $\overline{Q}$ of the D flip-flop (e.g., to produce a phase shift) and such as where a clock pin of a downstream stage of the clock divider is connected to the noninverted output Q of the previous stage. Aspects of embodiments of the present disclosure also include detecting clock dividers implemented using other circuits, such as Johnson counter (e.g., a shift register network clocked by the input signal, where the output of the last register is fed back to the input of the first register).

When the computer system identifies insecure inputs to the clock divider 310 at 250 of the method 200 of FIG. 2, the computer system identifies the source of the clock signal CLK and determines whether the source has been declared in the integrated circuit design as being secure.

In the example of a clock divider, the input clock signal CLK should come from a portion or zone of the integrated circuit which has been declared to be secure. For example, a sub-circuit or zone of an integrated circuit design may be declared as being secure using a corresponding command in the hardware description language (HDL) that is used to describe the integrated circuit design. Modules or zones of the integrated circuit design that were provided by trusted parties (e.g., developed internally by the organization) may have portions of the designs declared as being secure, but modules or zones of the integrated circuit design that were provided by untrusted third parties (e.g., licensed designs from third parties) lack the declaration that these are secure. As another example, a signal that is connected directly to an external pad of the integrated circuit (e.g., an external clock signal provided by a physical oscillator) may be marked as insecure (or lack a declaration as being secure) because an attacker having physical possession of the integrated circuit can directly inject voltage signals at that pad.

In addition, for the outputs of the clock divider circuit to be secure, the input clock clk should be provided by a secured source (e.g., from a trusted zone) or the clock divider circuit itself may be declared as secure (e.g., declared by a user as secure in the hardware description language representation of the clock divider circuit). For example, in the clock divider 310, the flip-flops of the first stage 311, second stage 312, and third stage 313 are also declared in the HDL description of the integrated circuit design as being secure sub-circuits (e.g., using a HDL command for declaring a sub-circuit as being secure) such that output signals from the flip-flops of the first stage 311, second stage 312, and third stage 313 are treated as being received from a trusted zone.

Clock gating is a technique used for reducing the power consumption of an integrated circuit by switching off the clock signal supplied to designated portions of the integrated circuit. For example, applications running on a computing device may have varying demands on a processor of the device depending on whether the computing device is actively performing a demanding task (e.g., running an intensive simulation or video game), performing non-intensive task (e.g., displaying a plain text email), or idling. In a case where the processor is a multi-core processor, individual cores can be turned on when demand is high (to deliver additional computing resources) and turned off when demand is low (to reduce power consumption). Clock gating provides a technique for turning parts of an integrated circuit on and off (e.g., enabling and disabling processor cores) by supplying clock signals to that portion of the integrated circuit or not supplying clock signals.

Figure 3B:
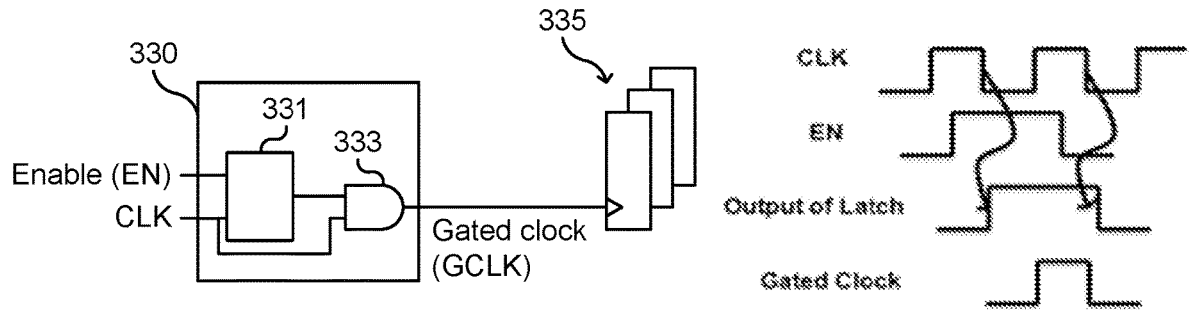
FIG. 3B depicts an example of a clock gate that is analyzed to detect vulnerabilities, according to one embodiment of the present disclosure.

FIG. 3B depicts an example of a clock gate 330 that is analyzed to detect vulnerabilities, according to one embodiment of the present disclosure. The clock gate includes two input ports: an enable pin and a clock (CLK) pin and one output port, which outputs a gated clock signal (GCLK). When the enable signal is activated, the enable signal is stored in a latch 331, which outputs the stored value as triggered by the clock signal (CLK). When the enable signal is activated, the clock signals pass through a logic gate 333 to a clock tree connected to sequential elements (e.g., registers) of a portion 335 of the integrated circuit design that is controlled by this clock gate 330. As such, the enable signal supplied to the clock gate 330 controls whether the portion 335 of the integrated circuit design is turned on or off.

As shown in the waveform diagrams in FIG. 3B, the clock gate 330 uses a negative edge triggered latch 331 to synchronize the enable signal EN to the clock signal CLK. The gated clock signal GCLK is available only when the latch output is high. The gated clock signal GCLK is held low when the enable signal EN is low.

Figure 3C:
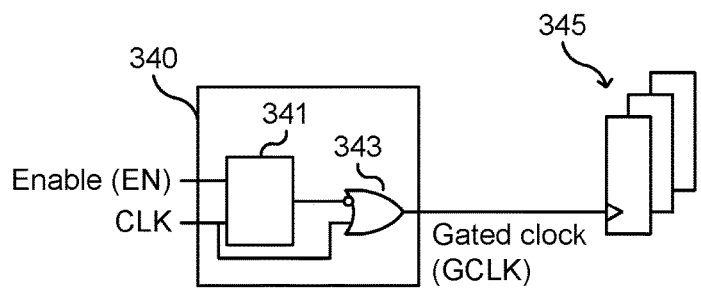
FIG. 3C depicts another example of a clock gate that is analyzed to detect vulnerabilities, according to one embodiment of the present disclosure.

FIG. 3C depicts another example of a clock gate 340 that is analyzed to detect vulnerabilities, according to one embodiment of the present disclosure. The example clock gate 340 uses a positive edge triggered latch 341 and an OR gate 343. The gated clock signal GCLK is held high when the enable signal EN is low. The output of the latch 341 is inverted at the input to the OR gate 343. Hence, the clock signal CLK is passed through to the gated clock signal GCLK when the enable signal EN is low.

The clock gate 330 and the clock gate 340 of FIGS. 3B and 3C respectively provide examples of clock gate circuits that are automatically detected by the computer system in the clock path of a sub-circuit of an integrated circuit design at 210, although embodiments of the present disclosure are not limited thereto and may also include the automatic detection of other clock gating circuit structures that provide equivalent clock gating functionality.

At 230, the computer system identifies whether the clock signal CLK and the enable signal EN for a detected clock gate are secured, such as whether the clock signal CLK comes from a secure source within the integrated circuit design and whether the enable signal EN comes from a secured source within the integrated circuit design. For example, allowing an unsecured (or insecure) part of the integrated circuit to control the enable signal EN allows an attacker to control the clock gate and thereby control the operation of the portion of the integrated circuit that operates under the control of the gated clock signal GCLK. This allows an attacker to, for example, turn on parts of the integrated circuit unnecessarily (thereby causing a battery powered device to drain its battery more quickly) or turn off parts of the integrated circuit when they are needed (e.g., resulting in a denial-of-service attack because the device cannot use the hardware resources controlled by the clock gate).

Some integrated circuit designs are designed to operate at multiple different clock rates, such as operating at a higher clock rate when high performance is needed and operating at a lower clock rate to reduce power consumption when idling or when operating in the background. Integrated circuit designs may include clock multiplexers such that different clocks (e.g., a high clock rate versus a low clock rate) can be supplied to control a portion of an integrated circuit. These different clocks may be provided, for example, by a clock divider circuit as described above.

Figure 3D:
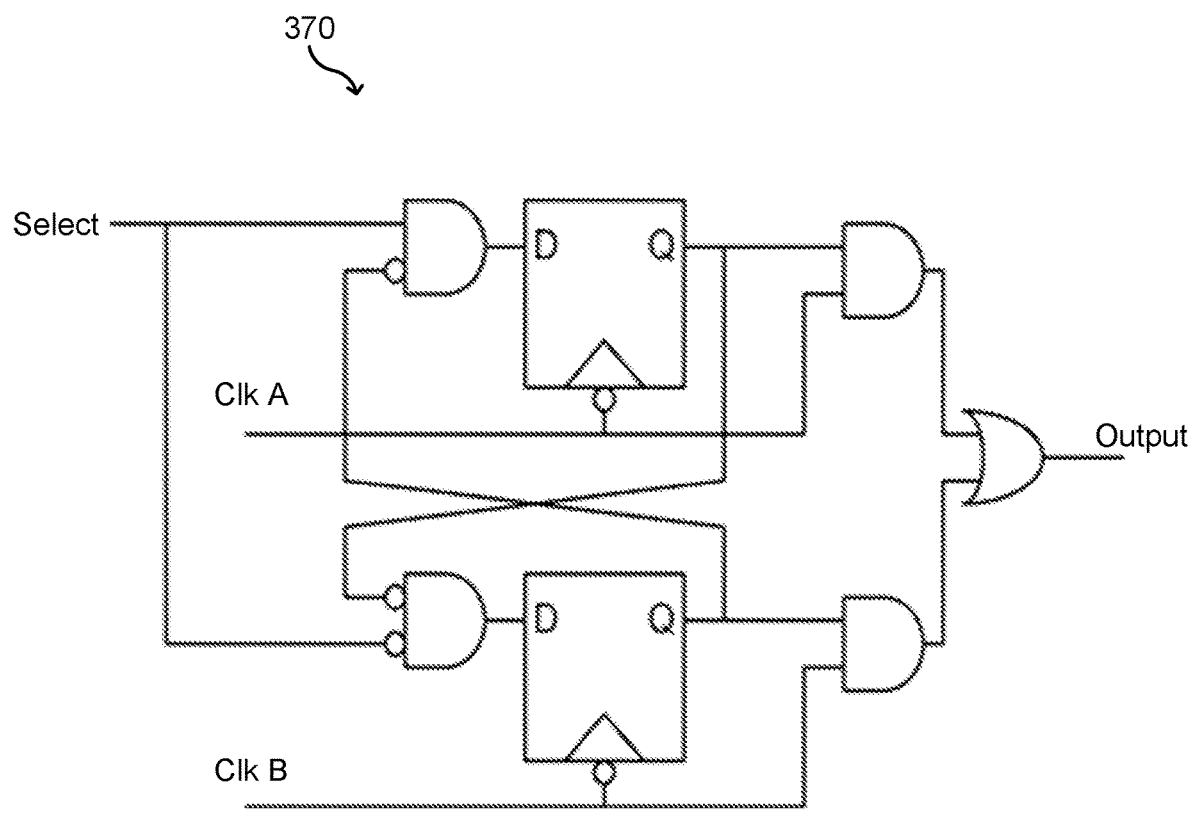
FIG. 3D depicts an example of a clock multiplexer that is analyzed to detect vulnerabilities, according to one embodiment of the present disclosure.

FIG. 3D depicts an example of a clock multiplexer 370 that is detected and analyzed to detect vulnerabilities in the integrated circuit design, according to one embodiment of the present disclosure. As shown in FIG. 3D, a select signal controls whether a first clock (Clk A) or a second clock (Clk B) is supplied to an output of the clock multiplexer 370. FIG. 3D presents one example of a clock multiplexer detected by a computer system at 210 of method 200 shown in FIG. 2 but embodiments of the present disclosure are not limited to detecting this form of a clock multiplexer and may also be applied to detecting other circuits having equivalent functionality, where a select signal is used to select between two or more clock signals, where the selected clock signal is supplied to an output that provides a clock signal that controls a portion of the integrated circuit design.

In a similar manner as discussed above, the computer system detects whether the inputs to the clock multiplexer 370 are secure, namely the clock signals (e.g., Clk A and Clk B of FIG. 3D) and the control signal (e.g., the select signal of FIG. 3D). If any of these inputs comes from an insecure source, then the insecure source presents a vulnerability that may be used by an attacker to control the clock multiplexer 370 and thereby control the clock rate of another portion of the integrated circuit of the design. (E.g., running a portion of the integrated circuit too slowly to meet the requirements of the application or running a portion of the integrated circuit at a higher clock rate to drain battery power more quickly.) For example, attacking the select signal may allow an attacker to select a different clock signal than that intended by the computing device, and attacking the individual clock signals can cause the clock multiplexer 370 to supply a different clock rate than intended by the computing device.

Clock multiplexing can also be used during design for testing (DFT) logic insertion to select or deselect the DFT logic. However, if an attacker can manipulate the clock multiplexer to select the DFT logic, then the DFT logic presents a scan side channel to be used to reverse-engineer the design intent of the integrated circuit, which presents a security threat because the attacker can then use this information to detect other vulnerabilities in the integrated circuit design. Accordingly, securing the clock multiplexer to prevent the selection of DFT logic further secures the integrated circuit against attacks.

In power-aware clock domain crossing (CDC) analysis, the integrated circuit design is partitioned into multiple power domains. To reduce power consumption, integrated circuit designers add isolation, retention, and voltage shifter components at the power domain interfaces. However, an insecure power management unit (PMU) allows an attacker to control the power domains of an integrated circuit design and thereby activate or deactivate various parts of the integrated circuit or adjust their operating frequencies. As such, aspects of embodiments of the present disclosure relate to analyzing the security of a PMU of an integrated circuit design, such as ensuring that the inputs to the PMU come from secured parts of the integrated circuit. In addition, clock enable signals crossing multiple power domains require the insertion of isolation cells to isolate signals crossing between a power gated domain and an always-on power domain.

Figure 4:
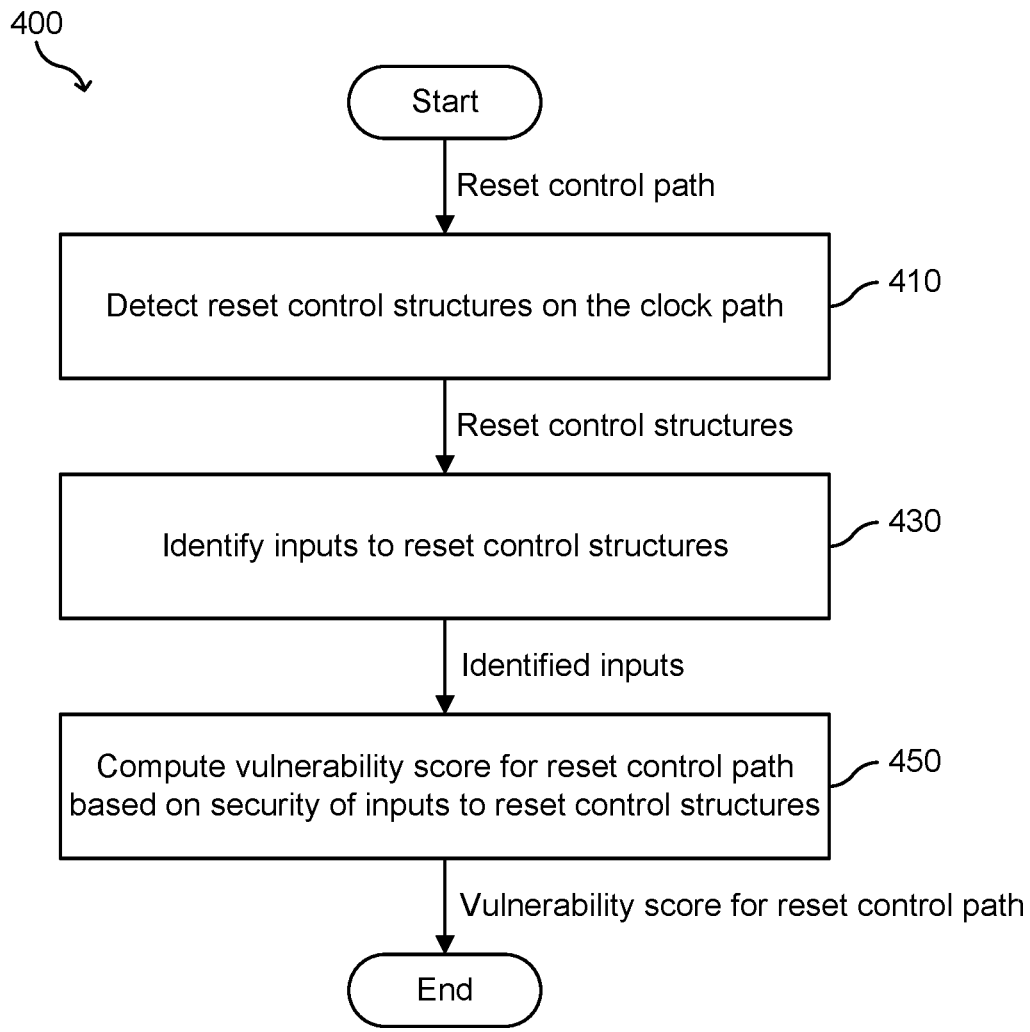
FIG. 4 is a flowchart depicting a method for detecting a reset path vulnerability, according to one embodiment of the present disclosure.

Aspects of embodiments of the present disclosure relate to analyzing a reset control path for vulnerabilities (e.g., at 165 of method 160 shown in FIG. 1B). FIG. 4 is a flowchart depicting a method 400 for detecting a reset path vulnerability to measure vulnerability to tampering with a reset path, according to one embodiment of the present disclosure. Methods in accordance with various embodiments of the present disclosure may be implemented using a processing device which may include one or more computer systems. An example of a computer system 900 is described below with respect to FIG. 9.

Malicious control of signals present in reset circuitry can introduce faults in reset signals with respect to their active values and sequencing, thereby causing the integrated circuit or chip to malfunction and which may result in denial of services from the chip. In some embodiments of the present disclosure, the threat model for these vulnerabilities includes trojans inserted into the reset path control logic of insecure sub-circuits along a reset path supplied to a sub-circuit. Accordingly, aspects of embodiments of the present disclosure relate to detecting reset control structures present in the reset path and checking whether input signals originating from untrusted zones in the integrated circuit design can affect the identifier reset control structures and thereby induce faults through these reset signals. Aspects of embodiments of the present disclosure relate to automatically generating reports with vulnerability scores regarding vulnerabilities automatically detected in the reset paths of the sub-circuit, to direct engineers (e.g., chip design engineers) to modify the integrated circuit design to mitigate these vulnerabilities prior to fabrication of integrated circuits based on this design.

As noted above, when the computer system identifies a current signal path as being a reset path, the computer system analyzes the path through the sub-circuit starting from that current input to detect reset path vulnerabilities.

At 410, the computer system identifies reset control structures on the reset path. Examples of reset control structures such include a reset synchronizer, a reset multiplexer (reset mux), and a reset generator, although embodiments of the present disclosure are not limited thereto.

At 430, based on the type of identified reset control structure, the computer system identifies insecure inputs to the reset control structures based on determining whether signals from untrusted zones of the integrated circuit design can affect the reset control structure and thereby change the reset waveforms output to other parts of the sub-circuit and/or other parts of the integrated circuit design.

At 450, the computer system computes a vulnerability score for the reset path. In some embodiments, the computing of the vulnerability score provides a binary response such as "vulnerability detected" or "no vulnerability detected" without providing gradations as to severity of the vulnerability. In some embodiments, the vulnerability score is calculated based on scores in accordance with the width of the bus of the control signals (e.g., in bits) and the number of branches in the reset path, as described in more detail below with respect to data path analysis.

Specific examples of the computation of vulnerabilities for reset control structures will be described in more detail below in the case of a reset synchronizer, a reset multiplexer (or reset mux), and a reset generator.

Figure 5A:
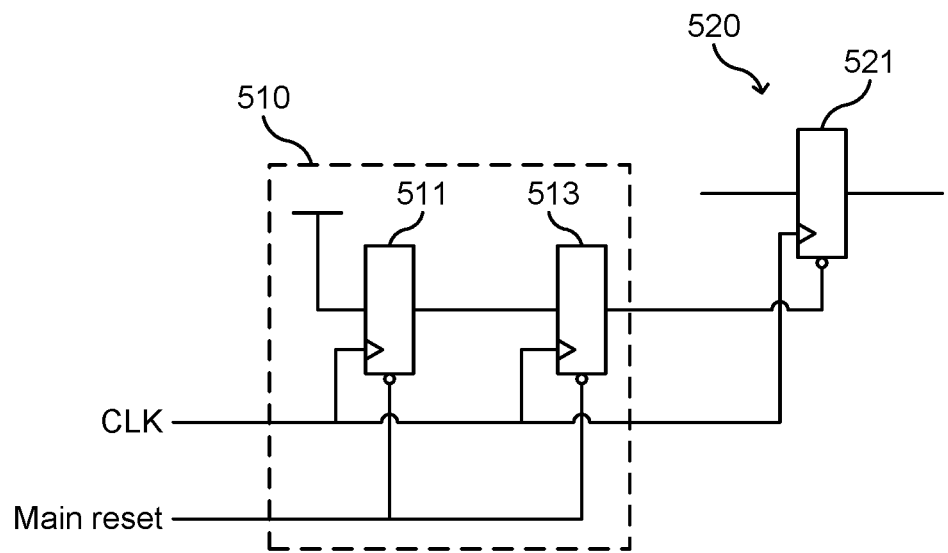
FIG. 5A depicts an example of a reset synchronizer that is analyzed to detect vulnerabilities, according to one embodiment of the present disclosure.

FIG. 5A depicts an example of a reset synchronizer 510 that is analyzed to detect vulnerabilities, according to one embodiment of the present disclosure. Some portions of an integrated circuit design implement a subsystem that supports asynchronous reset, which means the subsystem can be reset without an active clock edge (e.g., asynchronous during both assertion and de-assertion of a reset signal). The assertion of the reset signal does not create a vulnerability issue because it is independent of the clock signal. However, the de-assertion must meet a reset recovery time of the subsystem. A reset recovery time is similar to a setup timing condition on a flip-flop in that it defines a minimum time between the de-assertion of the reset signal and the next active clock edge. Accordingly, asynchronous reset signals can be asserted asynchronously but must be de-asserted synchronously.

The reset synchronizer 510 shown in FIG. 5A includes a first flip-flop 511 and a second flip-flop 513, where the reset synchronizer controls the de-assertion of a reset signal supplied to a subsystem 520, a representative component thereof is shown in FIG. 5A by a subsystem flip-flop 521. A main reset signal entering the subsystem asynchronously resets the first flip-flops 511 and the second flip-flop 513 of the reset synchronizer 510. The reset synchronizer 510 drives the signal for the rest the subsystem 520 ensuring that all the subsystem flip-flops 521 in it are asynchronously reset. This reset assertion is asynchronous to the subsystem clock, which need not be active at the time of reset. When the main reset signal de-asserts, the reset synchronizer 510 continues to assert the reset signal supplied to the flip-flops of the subsystem 520 until two active clock edges of the clock signal CLK have passed (e.g., one active edge for each flip-flop in the reset synchronizer 510). Because this reset removal is governed by the active clock edge, the reset synchronizer 510 controls the de-assertion of the reset signal to be synchronous.

Accordingly, some aspects of embodiments of the present disclosure relate to automatically detecting at 410, by a computer system, a reset synchronizer circuit such as the reset synchronizer 510 shown in FIG. 5A (e.g., where a reset control signal is connected to the reset pins of a chain of flip-flops and the output of the last flip-flop in the chain is connected to the reset pins of a sub-system or other portion of an integrated circuit design).

At 430, the computer system analyzes the detected reset synchronizer circuit for vulnerabilities, including ensuring that the input clock and the input master reset signal both come from secured portions of the integrated circuit design and that the reset synchronizer circuit itself is also declared as being a secured part of the integrated circuit design.

Figure 5B:
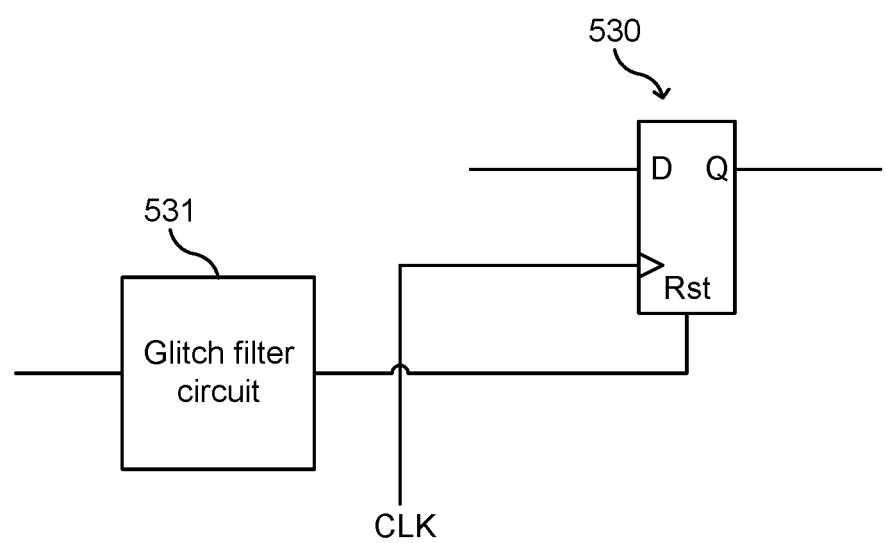
FIG. 5B is a schematic depiction of a reset generator detected and analyzed for security vulnerabilities, in accordance with some embodiments of the present disclosure.

FIG. 5B is a schematic depiction of a reset generator 530 detected and analyzed for security vulnerabilities, in accordance with some embodiments of the present disclosure. The reset generator 530 includes a flip-flop which is configured to generate the reset. For generated resets or soft resets, the reset generation logic should be secured to protect against the malicious insertion of a trojan or other attack mechanism that would cause a reset signal to be asserted at a time that is undesired by the user, such as causing a reset to be triggered during a critical stage when the integrated circuit is controlling an external device or a denial of service attack where the integrated circuit, or a portion thereof, is continually reset. Accordingly, some aspects of embodiments of the present disclosure relate to detecting whether the reset generation logic is secure (e.g., detecting, by the computer system at 430 of FIG. 4, whether the inputs to the reset generation logic, such as the glitch filter circuit 531 shown in FIG. 5B, are secured) and computing a vulnerability score for the reset generation logic.

Similarly, in the case of multiple resets reaching the flip-flops through a multiplexer, some aspects of embodiments of the present disclosure relate to ensuring that the select logic for the multiplexer is secured. In some embodiments, a computer system would detect a reset mux at 410 by detecting a multiplexer circuit that received two or more reset signals as inputs and output a reset signal to reset pins of one or more flip-flops. At 430, the computer system would detect whether the inputs to the reset mux include insecure inputs, such as identifying whether the source of the select signal is a secure sub-circuit of the integrated circuit design.

In some embodiments of the present disclosure, the vulnerability score computed for a reset control path at 450 may be a binary score indicating "no vulnerability detected" or "vulnerability detected" based on the results of the analysis of the sub-circuits along the reset control path. In some embodiments, the vulnerability score is calculated based on scores in accordance with the width of the bus of the control signals (e.g., in bits) and the number of branches in the control path for the reset control structure (e.g., the control path for the select signal for a reset multiplexer or the control path for the enable signal of a reset generator), as described in more detail below with respect to data path analysis.

Some aspects of embodiments of the present disclosure relate to analyzing a data path for vulnerabilities (e.g., at 165 of method 160 shown in FIG. 1B). The data flow paths may interact with control structures (e.g., logical if-else control structures and case structures, which may be implemented using, for example, multiplexers) and if these control structures are successfully exploited by an attacker, secret information (e.g., encryption keys) can be leaked.

Figure 6:
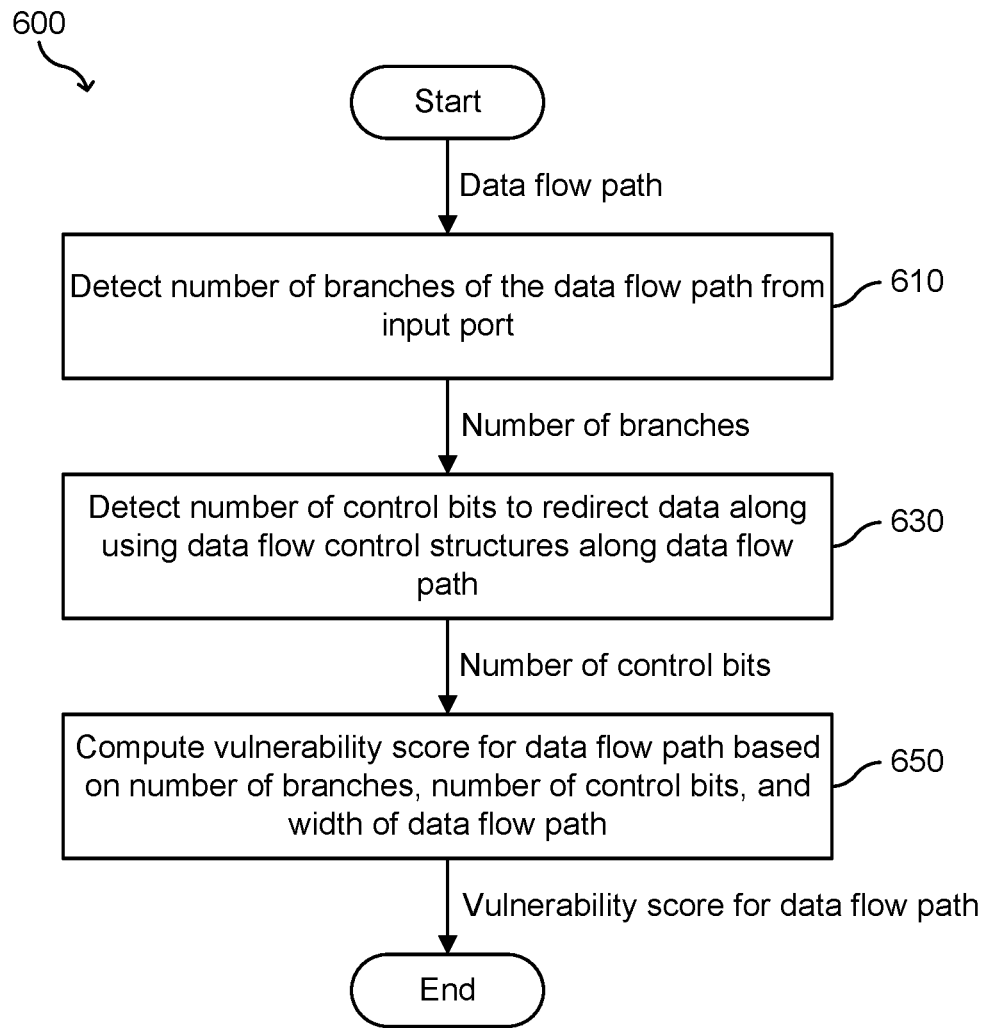
FIG. 6 is a flowchart depicting a method for detecting a data path vulnerability according to one embodiment of the present disclosure.

FIG. 6 is a flowchart depicting a method 600 for detecting a data path vulnerability, such as to measure the vulnerability of the data path to a laser fault injection attack, according to one embodiment of the present disclosure. Methods in accordance with various embodiments of the present disclosure may be implemented using a processing device which may include one or more computer systems. An example of a computer system 900 is described below with respect to FIG. 9. In some embodiments, a threat model for data path vulnerabilities includes faults injected by laser that cause the integrated circuit to access protected data or to leak secret information.

According to some embodiments of the present disclosure, a data flow vulnerability check evaluates the data path and data flow across an integrated circuit design (or portion thereof) to assess potential data flow security risks of the integrated circuit design, where the vulnerability check analysis may be based on, for example, how data flows from input to output, how the data is enabled or selected, and how the data is used.

Referring back to FIG. 1C, as noted above, input port C supplies a clock signal to the sub-circuit 180 and input port D supplies an enable signal that controls the clock gate 185 and thereby controls the clock signals supplied to a portion of the sub-circuit. Input port A and input port B are data ports and output port Y and output port Z are data output ports. In some embodiments of the present disclosure, individual data signals or ports may be declared as being secured (e.g., transmitting sensitive data) and, in such cases, embodiment of the present disclosure limit the analysis to these secured ports and the paths extending from these secured ports.

Some aspects of embodiments of the present disclosure relate to analyzing the security of a data path based on branching vulnerabilities. The number of branches in a data flow path is used as a measure of the difficulty in diverting data along that path, as the difficulty of diverting data along a data flow path is inversely proportional to the number of bits or control variables between an input data port and an output data port. Accordingly, at 610, the computer system detects the number of branches of the data flow path from a given input port of a data flow path through the sub-circuit.

Figure 7A:
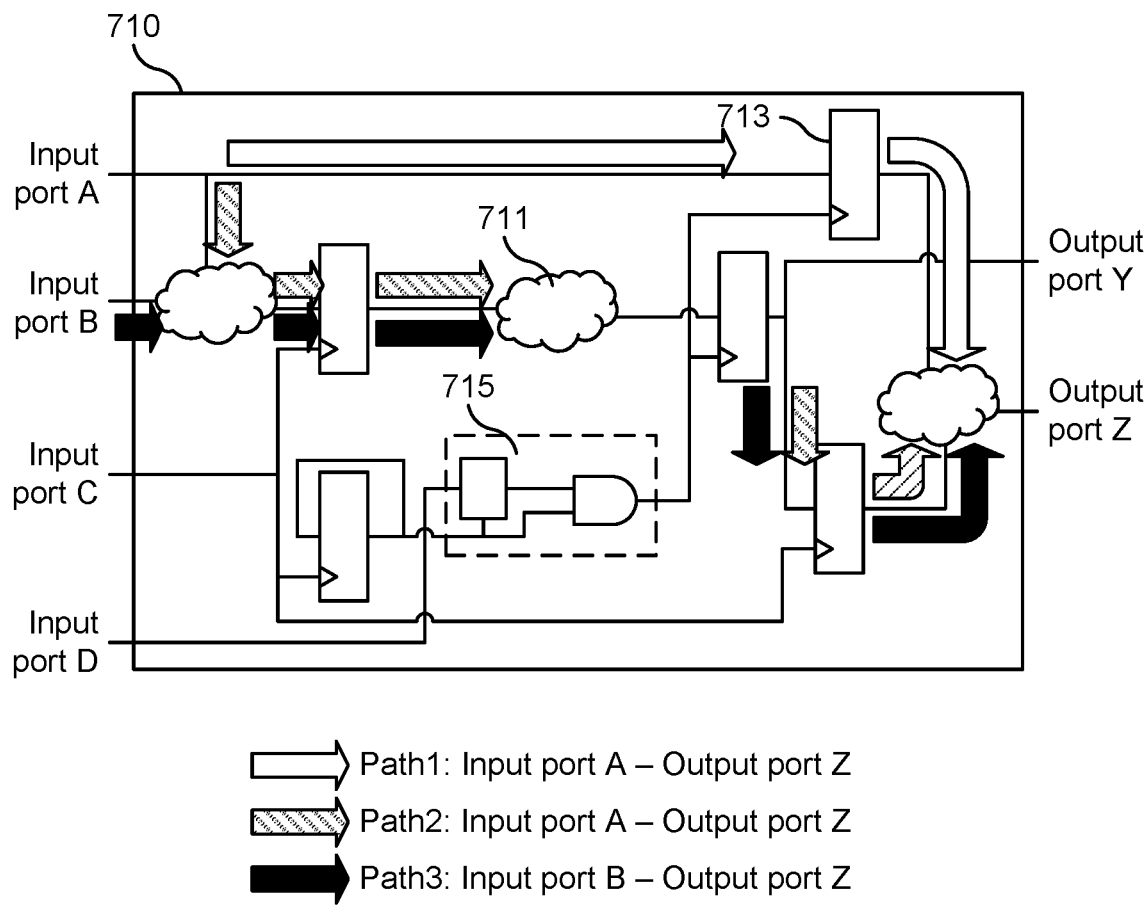
FIG. 7A depicts the example sub-circuit shown in FIG. 1C with data flow paths labeled for analysis for data flow vulnerabilities, in accordance with an embodiment of the present disclosure.

FIG. 7A depicts the example sub-circuit 710 shown in FIG. 1C with data flow paths labeled for analysis for data flow vulnerabilities, in accordance with an embodiment of the present disclosure. The example sub-circuit 710 shown in FIG. 7A has four input ports—labeled input port A, input port B, input port C, and input port D—and two output ports—labeled output port Y and output port Z. The sub-circuit 710 is shown as having various combinational logic networks 711 shown as clouds and various sequential elements 713, shown as flip-flops. The sub-circuit 710 also includes a clock gating structure 715 which is shown as including a latch and an AND gate, which allows portions of the integrated circuit design to be disabled, thereby reducing power consumption of the sub-circuit when those disabled potions are not needed.

FIG. 7A shows three data paths indicated with different arrows. A first path (Path1) is indicated with unfilled arrows and refers to a data flow path from input port A to output port Z. A second path (Path2) is indicated with diagonally shaded arrows and refers to a different data flow path from input port A to output port Z. It is assumed that a portion of the data received through input port A flows along the first path (Path1) and a different portion of the data flows along the second path (Path2) (e.g., in a specific example where input port A is 8 bits wide, the 4 least significant bits received through input port A may flow along Path1 and the 4 most significant bits received through input port A may flow along Path2). As such, the first path (Path1) and the second path (Path2) may be considered as two different branches of a data path that begins at input port A. For this analysis, it is not assumed that the same data flows along the first path (Path1) and the second path (Path2).

A third path (Path3) is indicated with filled arrows and refers to a data frow path from input port B to output port Z.

Here, an attacker attempting to capture the data supplied to input port B only needs to attack one branch within the circuit along the third path Path3. On the other hand, an attacker attempting to capture the data supplied to input port A must capture the data that flows through two different branches along the first path (Path1) and the second path (Path2). Therefore, all else being equal, the data flowing through input port A is analyzed to be more secure than the data flowing through input port B, because the data flowing through input port A flows through more separate branches within the sub-circuit.

At 630, the computer system analyzes the number of control bits for the data flowing through a data path. For example, considering a data flow path with a single 2-to-1 multiplexer (or a 1-to-2 demultiplexer) that is controlled by a one-bit select line, an attacker who can control the select line on the multiplexer can select data from the other input of the multiplexer (or select a different destination for the output of a demultiplexer) by flipping the single bit of the select line. In contrast, an 8-to-1 multiplexer (or 1-to-8 demultiplexer) has three control bits, and therefore selecting a specific input of an 8-to-1 multiplexer (or selecting a specific output of a 1-to-8 demultiplexer) requires the attacker to set the values of three bits. For the purposes of vulnerability analysis according to some embodiments of the present disclosure, it is assumed that a data flow path is less secure when fewer bits need to be flipped by an attacker to control the flow of data and that a data flow path is more secure when more bits need to be flipped by the attacker.

Figure 7B:
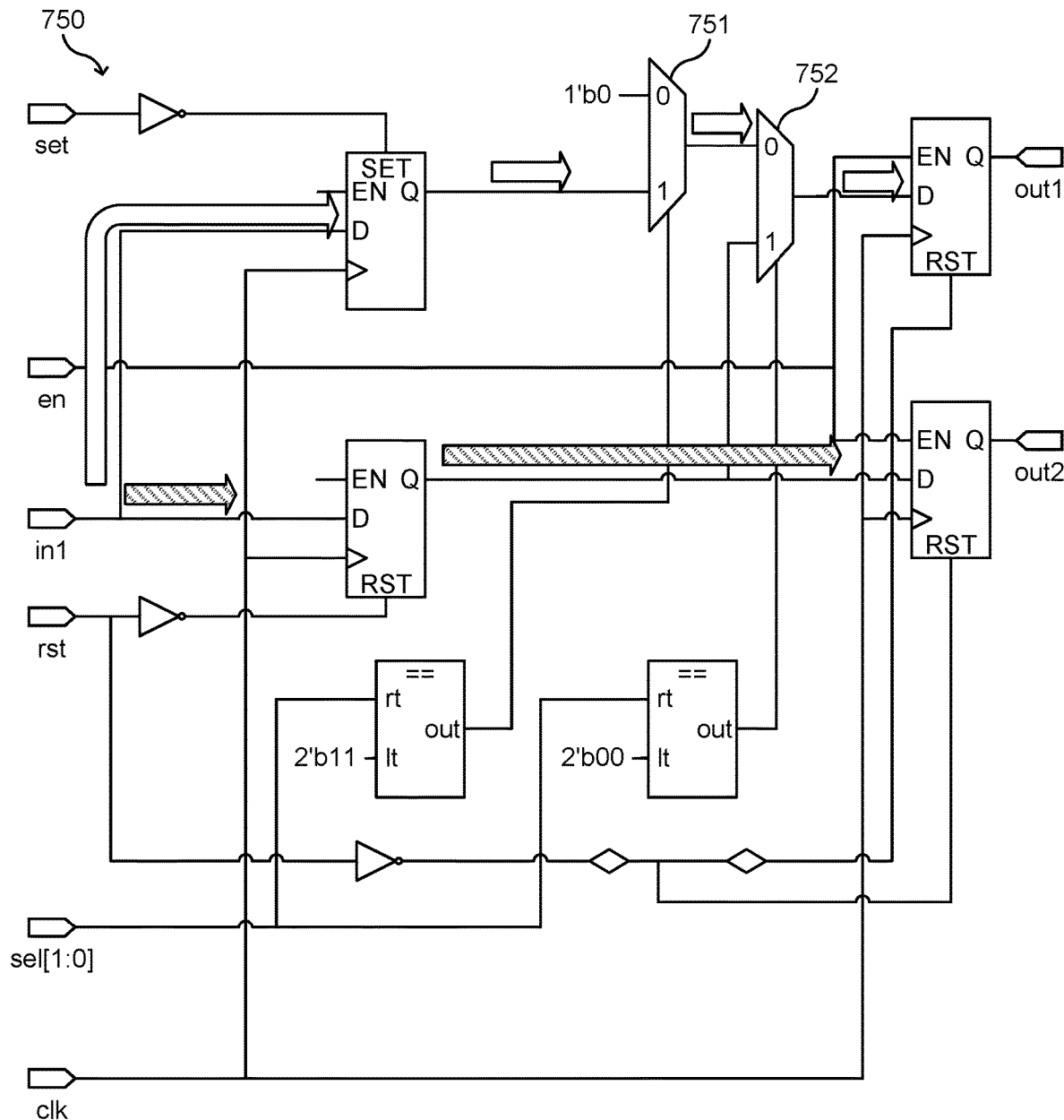
FIG. 7B depicts another example sub-circuit with data flow paths having branches (e.g., controlled by multiplexers) that is analyzed to detect vulnerabilities in the data flow paths, in accordance with an embodiment of the present disclosure.

FIG. 7B depicts another example sub-circuit with data flow paths having branches (e.g., controlled by multiplexers) that is analyzed to detect vulnerabilities in the data flow paths, in accordance with an embodiment of the present disclosure. The example sub-circuit 750 shown in FIG. 7B has six inputs, labeled rst, set, in1, sel[1:0], en, and clk. Among these inputs, clk is a clock signal because it is connected to clock pins of flip-flops in the circuit. Rst is a reset signal because it is connected to reset pins (RST) of flip-flops in the circuit. Set, en, and sel are control signals because they are connected to set, enable, and select pins of various portions of the sub-circuit 750. Therefore, there is one data input port, input port in1, and two data output ports, first output port out1 and second output port out2.

There are two control variables in the form of first multiplexer 751 and second multiplexer 752 between the input port in1 and first output port out1, but there is no control variable (e.g., no multiplexers) along the data path between the input port in1 and the second output port out2.

As such, the computer system determines that the path from the input port in1 to the second output port out2 is more vulnerable than the path from input port in1 to the first output port out1 based on the number of control bits that are needed to control the output of the data to the first output port out1 (e.g., two bits to control the two multiplexers 751 and 752) compared to the number of bits that are used to control the output of the data to the second output port out2 (e.g., zero bits).

Some aspects of embodiments of the present disclosure also relate to using a data bus width. As the data bus grows wider, the security risk grows because more data is leaked when the data is diverted by modifying (e.g., flipping) control bits that control the flow of data on the data flow path (e.g., multiplexers and demultiplexers or other conditional or case structures as represented in the hardware description language).

Accordingly, in some embodiments, a portion of a vulnerability score is computed for a data flow path of a sub-circuit, where the portion of the vulnerability score is proportional to the width of the data bus and inversely proportional to the number of control bits controlling the data flow path. For example, in some embodiments, a portion of the vulnerability score of a data flow path of the sub-circuit is computed based on (or is proportional to) the width of the data bus (e.g., in bits) divided by the number of control variable or control bits controlling the flow of data on that data path (e.g., in bits).

At 167 of method 160 of FIG. 1B, after computing a security vulnerability for a current signal path of the sub-circuit, the computer system determines whether there are more signal paths of the sub-circuit to be analyzed for security vulnerabilities. If so, then the computer system selects a next signal path of the sub-circuit at 161. If not (e.g., if all of the signal paths of the sub-circuit have been analyzed, then at 169 the computer system generates a sub-circuit level report including the security vulnerability results computed at 165 for the signal paths of the sub-circuit.

In some embodiments of the present disclosure, when the computer system detects multiple data paths in a sub-circuit (such as in the example sub-circuits shown in FIG. 7A and FIG. 7B), the computer system generates a sub-circuit level report that shows one data path vulnerability score for that sub-circuit based on the most vulnerable data flow path in the sub-circuit. For example, in some embodiments of the present disclosure, at 650 of method 600 shown in FIG. 6, the computer system computes a vulnerability score for each data flow path in the sub-circuit and, at 169 of method 160 of FIG. 1B, generates a sub-circuit level report that includes a data flow path vulnerability score for that sub-circuit of the full design based on the vulnerability score associated with the most vulnerable data flow path of that sub-circuit.

Referring to FIG. 1A, at 130 of method 100, based on sub-circuit level hardware security vulnerability reports generated for each secured sub-circuit analyzed at 120, the computer system generates a hardware security vulnerability report for the integrated circuit design supplied as input to the method 100.

In some embodiments, the hardware security vulnerability report for the integrated circuit design includes each of the sub-circuit level hardware security vulnerability reports generated at 120. In some embodiments, the sub-circuits are ranked or ordered based on their relative vulnerability scores (e.g., the vulnerability scores of the most vulnerable paths within each sub-circuit), such that the report draws attention to the most vulnerable sub-circuits of the integrated circuit design. In some embodiments, the signal paths of the sub-circuits are ranked or ordered based on relative vulnerability scores, such that the report draws attention to the most vulnerable signal paths within the integrated circuit design.

In some embodiments of the present disclosure, generating the hardware security vulnerability report at 130 includes computing hardware security risks arising from the propagation of insecure outputs from one sub-circuit to inputs of other sub-circuits. For example, a collection of sub-circuits may be controlled by a given clock signal (e.g., these sub-circuits are part of a same clock domain) and may exhibit hardware security vulnerabilities with respect to the clock signals supplied to their clock input ports. In particular, the computer system may generate sub-circuit level hardware security vulnerability reports for these sub-circuits that indicate clock signal path vulnerabilities due to the clock signal being received from an untrusted upstream source. Accordingly, a security vulnerability analysis of a sub-circuit that provides this clock signal to these sub-circuits (e.g., a circuit that includes a clock gate or clock multiplexer that controls the clock signal supplied to these sub-circuits) may be given a score that indicates a higher security vulnerability, scaled based on the number of sub-circuits that receive a clock signal from that sub-circuit source (e.g., in the fan-out cone of the output port of the vulnerable signal path of the sub-circuit). For example, sub-circuit with a clock multiplexer that has an output port with a fan-out cone of 100,000 other sub-circuits may be given a score indicating a higher security vulnerability than a similar sub-circuit with a clock multiplexer that supplies clock signals to 1,000 other sub-circuits (e.g., with 1,000 other sub-circuits in the fan-out cone). In some embodiments, the vulnerability score is weighted by the area of the circuit design occupied by the sub-circuits of the fan-out cone rather than the number of sub-circuits.

According to one embodiment of the present disclosure, a method includes: receiving an integrated circuit design; classifying, by the processing device, a signal path of a sub-circuit of the integrated circuit design based on a connection between an input port of the signal path and a component of the sub-circuit to generate a classification of the signal path; computing, by the processing device, a security vulnerability result of the sub-circuit of the integrated circuit design based on the classification of the signal path and based on a trust level of a zone in a fan-in cone to an input port of the signal path; and generating a security vulnerability report based on the security vulnerability result of the sub-circuit of the integrated circuit design.

The security vulnerability result of the sub-circuit may include a score computed based on: a bus width of the signal path; and a number of branches in the signal path.

The classification of the signal path may include a data path classification, the signal path being connected to a data pin of the component of the sub-circuit, and the security vulnerability result may include a score computed based on: a bus width of the signal path; and a number of branches in the signal path.

The classification of the signal path may include a clock path classification, the signal path being connected to a clock pin of the component of the sub-circuit, and the security vulnerability result of the signal path may be computed based on: detecting a clock control structure on the signal path; identifying an input to the clock control structure; and computing a vulnerability score for the signal path based on a trust level of a fan-in cone of the input to the clock control structure.

The vulnerability score may be computed based on a bus width of the input to the clock control structure.

The classification of the signal path may include a control path classification, the signal path being connected to a control pin of the component of the sub-circuit, and the security vulnerability result of the signal path may be computed based on: detecting a reset control structure on the signal path; identifying an input to the reset control structure; and computing a vulnerability score for the signal path based on a trust level of a fan-in cone of the input to the reset control structure.

The security vulnerability result may include a vulnerability score computed based on a fan-out cone from an output port of the signal path.

According to one embodiment of the present disclosure, a system includes: a memory storing instructions; and a processor, coupled with the memory and to execute the instructions, the instructions when executed cause the processor to: receive an integrated circuit design including a plurality of sub-circuits; compute a plurality of sub-circuit level security vulnerability scores for corresponding ones of the plurality of sub-circuits of the integrated circuit design, a sub-circuit level security vulnerability score being computed for a sub-circuit of the plurality of sub-circuits based on: classifying a signal path of the sub-circuit of the plurality of sub-circuits to generate a classification of the signal path; and computing a security vulnerability score of the sub-circuit based on the classification of the signal path and based on a trust level of a zone in a fan-in cone of the signal path; and generate a hardware security vulnerability report for the integrated circuit design based on the plurality of sub-circuit level security vulnerability scores.

The security vulnerability score of the sub-circuit may be further computed based on a bus width of the path.

The classification of the signal path may include a data path classification, and the computing the security vulnerability score of the sub-circuit may further include a calculation proportional to a bus width of the signal path and inversely proportional to a number of branches in the signal path.

The classification of the signal path may include a control path classification, and the computing the security vulnerability score of the sub-circuit may include a calculation inversely proportional to a bus width of the signal path.

The classification of the signal path may include a clock path classification, and the computing the security vulnerability score may include a calculation inversely proportional to a bus width of a control signal controlling a clock control structure on the signal path.

The computing the security vulnerability score may include identifying sub-circuits in a fan-out cone from an output port of the signal path.

The computing the security vulnerability score may include weighting the security vulnerability score based on a number of sub-circuits in the fan-out cone from the output port of the signal path.

According to one embodiment of the present disclosure, a non-transitory computer-readable medium includes stored instructions, which when executed by a processor, cause the processor to: receive an integrated circuit design including a plurality of sub-circuits; classify a signal path of a sub-circuit of the integrated circuit design based on a connection between an input port of the signal path and a component of the sub-circuit to generate a classification of the signal path; compute a security vulnerability result of the sub-circuit of the integrated circuit design based on the classification of the signal path and based on a trust level of a zone in a fan-in cone to an input port of the signal path; and generate a security vulnerability report based on the security vulnerability result of the sub-circuit of the integrated circuit design.

The security vulnerability result of the sub-circuit may include a score computed based on: a width of the signal path; and a number of branches in the signal path.

The classification of the signal path may include a data path classification, the signal path being connected to a data pin of the component of the sub-circuit, and the security vulnerability result may include a score computed based on: a bus width of the signal path; and a number of branches in the signal path.

The classification of the signal path may include a clock path classification, the signal path being connected to a clock pin of the component of the sub-circuit, and the security vulnerability result of the signal path is computed based on: detecting a clock control structure on the signal path; identifying an input to the clock control structure; and computing a vulnerability score for the signal path based on a trust level of a fan-in cone of the input to the clock control structure.

The classification of the signal path may include a control path classification, the signal path being connected to a control pin of the component of the sub-circuit, and the security vulnerability result of the signal path may be computed based on: detecting a reset control structure on the signal path; identifying an input to the reset control structure; and computing a vulnerability score for the signal path based on a trust level of a fan-in cone of the input to the reset control structure.

The security vulnerability result may include a vulnerability score computed based on a fan-out cone from an output port of the signal path.

Figure 8:
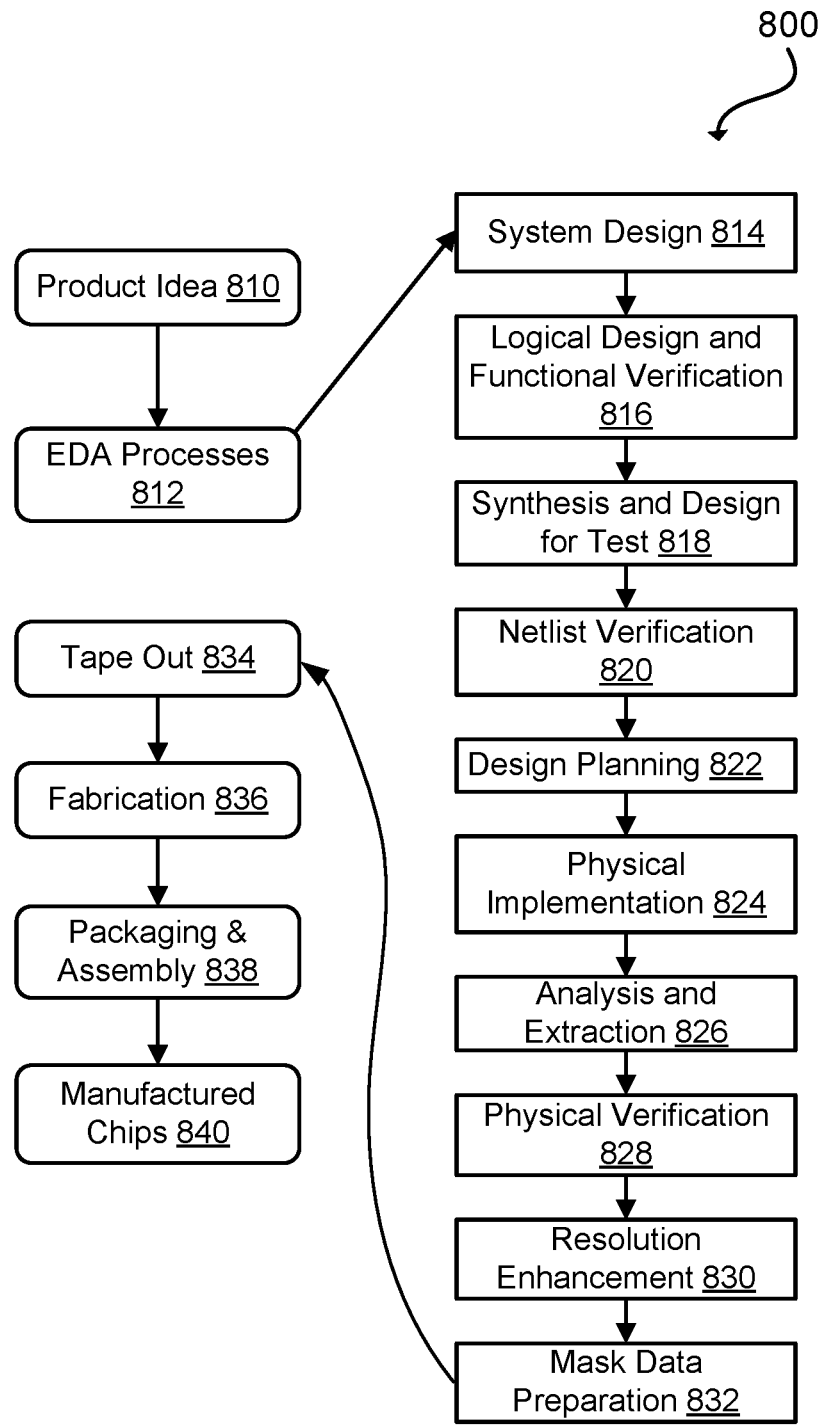
FIG. 8 depicts a flowchart of various processes used during the design and manufacture of an integrated circuit in accordance with some embodiments of the present disclosure.

FIG. 8 illustrates an example set of processes 800 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 810 with information supplied by a designer, information which is transformed to create an article of manufacture that uses a set of EDA processes 812. When the design is finalized, the design is taped-out 834, which is when artwork (e.g., geometric patterns) for the integrated circuit is sent to a fabrication facility to manufacture the mask set, which is then used to manufacture the integrated circuit. After tape-out, a semiconductor die is fabricated 836 and packaging and assembly processes 838 are performed to produce the finished integrated circuit 840.

Specifications for a circuit or electronic structure may range from low-level transistor material layouts to high-level description languages. A high-level of representation may be used to design circuits and systems, using a hardware description language ('HDL') such as VHDL, Verilog, System Verilog, SystemC, MyHDL or Open Vera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding systems of that layer (e.g., a formal verification system). A design process may use a sequence depicted in FIG. 8. The processes described by FIG. 8 may be enabled by EDA products (or EDA systems).

During system design 814, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 816, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 818, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 820, the netlist is checked for compliance with timing constraints and for correspondence with the HDL code. During design planning 822, an overall floor plan for the integrated circuit is constructed and analyzed for timing and top-level routing.

During layout or physical implementation 824, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 826, the circuit function is verified at the layout level, which permits refinement of the layout design. During physical verification 828, the layout design is checked to ensure that manufacturing constraints are correct, such as DRC constraints, electrical constraints, lithographic constraints, and that circuitry function matches the HDL design specification. During resolution enhancement 830, the geometry of the layout is transformed to improve how the circuit design is manufactured.

During tape-out, data is created to be used (after lithographic enhancements are applied if appropriate) for production of lithography masks. During mask data preparation 832, the 'tape-out' data is used to produce lithography masks that are used to produce finished integrated circuits.

A storage subsystem of a computer system (such as computer system 900 of FIG. 9) may be used to store the programs and data structures that are used by some or all of the EDA products described herein, and products used for development of cells for the library and for physical and logical design that use the library.

Figure 9:
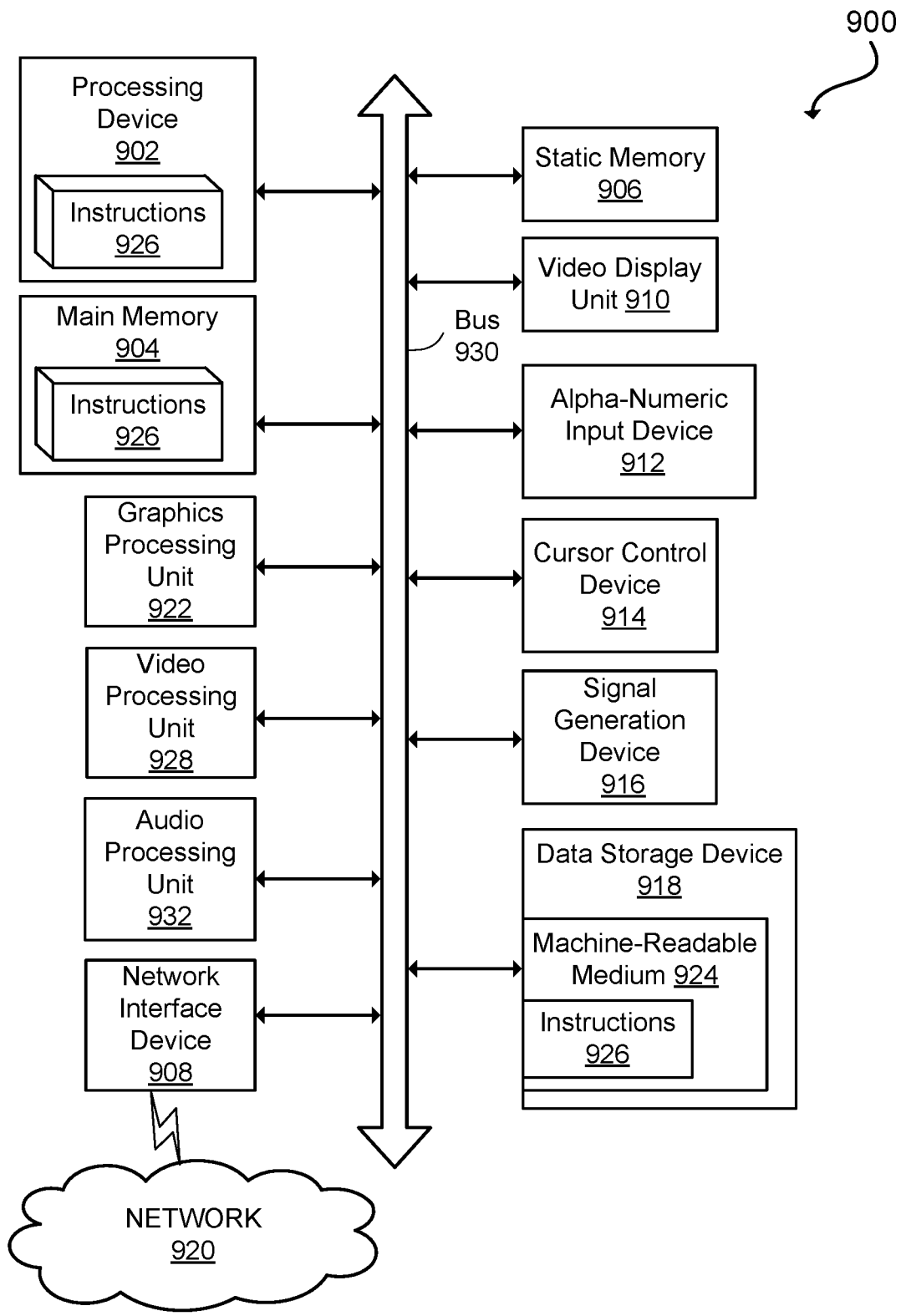
FIG. 9 depicts a diagram of an example computer system in which embodiments of the present disclosure may operate.

FIG. 9 illustrates an example machine of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random-access memory (DRAM) such as synchronous DRAM (SDRAM), a static memory 906 (e.g., flash memory, static random access memory (SRAM), etc.), and a data storage device 918, which communicate with each other via a bus 930.

Processing device 902 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 may be configured to execute instructions 926 for performing the operations and steps described herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a non-transitory computer-readable medium) on which is stored one or more sets of instructions 926 or software embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In some implementations, the instructions 926 include instructions to implement functionality corresponding to the present disclosure. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 902 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
    receiving an integrated circuit design;
    classifying, by a processing device, a signal path of a sub-circuit of the integrated circuit design based on a connection between an input port of the signal path and a component of the sub-circuit to generate a classification of the signal path;
    computing, by the processing device, a security vulnerability result of the sub-circuit of the integrated circuit design based on the classification of the signal path and based on a trust level of a zone in a fan-in cone to the input port of the signal path; and
    generating a security vulnerability report based on the security vulnerability result of the sub-circuit of the integrated circuit design.

2. The method of claim 1, wherein the security vulnerability result of the sub-circuit comprises a score computed based on:
    a bus width of the signal path; and
    a number of branches in the signal path.

3. The method of claim 1, wherein the classification of the signal path comprises a data path classification, the signal path being connected to a data pin of the component of the sub-circuit, and
    wherein the security vulnerability result comprises a score computed based on:
        a bus width of the signal path; and
        a number of branches in the signal path.

4. The method of claim 1, wherein the classification of the signal path comprises a clock path classification, the signal path being connected to a clock pin of the component of the sub-circuit, and
    wherein the security vulnerability result of the signal path is computed based on:
        detecting a clock control structure on the signal path;
        identifying an input to the clock control structure; and
        computing a vulnerability score for the signal path based on a trust level of a fan-in cone of the input to the clock control structure.

5. The method of claim 4, wherein the vulnerability score is computed based on a bus width of the input to the clock control structure.

6. The method of claim 1, wherein the classification of the signal path comprises a control path classification, the signal path being connected to a control pin of the component of the sub-circuit, and
    wherein the security vulnerability result of the signal path is computed based on:
        detecting a reset control structure on the signal path;
        identifying an input to the reset control structure; and
        computing a vulnerability score for the signal path based on a trust level of a fan-in cone of the input to the reset control structure.

7. The method of claim 1, wherein the security vulnerability result comprises a vulnerability score computed based on a fan-out cone from an output port of the signal path.

8. A system comprising:
    a memory storing instructions; and
    a processor, coupled with the memory and to execute the instructions, the instructions when executed cause the processor to:
        receive an integrated circuit design comprising a plurality of sub-circuits;

compute a plurality of sub-circuit level security vulnerability scores for corresponding ones of the plurality of sub-circuits of the integrated circuit design, a sub-circuit level security vulnerability score being computed for a sub-circuit of the plurality of sub-circuits based on:
classifying a signal path of the sub-circuit of the plurality of sub-circuits to generate a classification of the signal path; and
computing a security vulnerability score of the sub-circuit based on the classification of the signal path and based on a trust level of a zone in a fan-in cone of the signal path; and
generate a hardware security vulnerability report for the integrated circuit design based on the plurality of sub-circuit level security vulnerability scores.

9. The system of claim 8, wherein the security vulnerability score of the sub-circuit is further computed based on a bus width of the signal path.

10. The system of claim 9, wherein the classification of the signal path comprises a data path classification, and
wherein the computing the security vulnerability score of the sub-circuit further comprises a calculation proportional to the bus width of the signal path and inversely proportional to a number of branches in the signal path.

11. The system of claim 9, wherein the classification of the signal path comprises a control path classification, and
wherein the computing the security vulnerability score of the sub-circuit comprises a calculation inversely proportional to the bus width of the signal path.

12. The system of claim 9, wherein the classification of the signal path comprises a clock path classification, and
wherein the computing the security vulnerability score comprises a calculation inversely proportional to a bus width of a control signal controlling a clock control structure on the signal path.

13. The system of claim 9, wherein the computing the security vulnerability score comprises identifying sub-circuits in a fan-out cone from an output port of the signal path.

14. The system of claim 13, wherein the computing the security vulnerability score comprises weighting the security vulnerability score based on a number of sub-circuits in the fan-out cone from the output port of the signal path.

15. A non-transitory computer-readable medium comprising stored instructions, which when executed by a processor, cause the processor to:
receive an integrated circuit design comprising a plurality of sub-circuits;
classify a signal path of a sub-circuit of the integrated circuit design based on a connection between an input port of the signal path and a component of the sub-circuit to generate a classification of the signal path;

compute a security vulnerability result of the sub-circuit of the integrated circuit design based on the classification of the signal path and based on a trust level of a zone in a fan-in cone to the input port of the signal path; and
generate a security vulnerability report based on the security vulnerability result of the sub-circuit of the integrated circuit design.

16. The non-transitory computer-readable medium of claim 15, wherein the security vulnerability result of the sub-circuit comprises a score computed based on:
a width of the signal path; and
a number of branches in the signal path.

17. The non-transitory computer-readable medium of claim 15, wherein the classification of the signal path comprises a data path classification, the signal path being connected to a data pin of the component of the sub-circuit, and
wherein the security vulnerability result comprises a score computed based on:
a bus width of the signal path; and
a number of branches in the signal path.

18. The non-transitory computer-readable medium of claim 15, wherein the classification of the signal path comprises a clock path classification, the signal path being connected to a clock pin of the component of the sub-circuit, and
wherein the security vulnerability result of the signal path is computed based on:
detecting a clock control structure on the signal path;
identifying an input to the clock control structure; and
computing a vulnerability score for the signal path based on a trust level of a fan-in cone of the input to the clock control structure.

19. The non-transitory computer-readable medium of claim 15, wherein the classification of the signal path comprises a control path classification, the signal path being connected to a control pin of the component of the sub-circuit, and
wherein the security vulnerability result of the signal path is computed based on:
detecting a reset control structure on the signal path;
identifying an input to the reset control structure; and
computing a vulnerability score for the signal path based on a trust level of a fan-in cone of the input to the reset control structure.

20. The non-transitory computer-readable medium of claim 15, wherein the security vulnerability result comprises a vulnerability score computed based on a fan-out cone from an output port of the signal path.

* * * * *